(12) United States Patent
Joynt

(10) Patent No.: US 9,017,002 B1
(45) Date of Patent: Apr. 28, 2015

(54) REAR MOUNTED HAULER APPARATUS FOR A VEHICLE

(71) Applicant: Joseph Joynt, Payson, AZ (US)

(72) Inventor: Joseph Joynt, Payson, AZ (US)

( * ) Notice: Subject to any disclaimer, the term of this patent is extended or adjusted under 35 U.S.C. 154(b) by 139 days.

(21) Appl. No.: 13/732,214

(22) Filed: Dec. 31, 2012

Related U.S. Application Data

(60) Provisional application No. 61/582,432, filed on Jan. 2, 2012.

(51) Int. Cl.
| | | |
|---|---|---|
| *B60R 9/06* | (2006.01) | |
| *B60P 3/07* | (2006.01) | |
| *B66D 1/20* | (2006.01) | |
| *B60P 3/12* | (2006.01) | |
| *B60Q 1/26* | (2006.01) | |
| *B66D 1/12* | (2006.01) | |

(52) U.S. Cl.
CPC . *B60R 9/06* (2013.01); *B60P 3/122* (2013.01); *B60P 3/07* (2013.01); *B60Q 1/2657* (2013.01); *B66D 1/20* (2013.01); *B66D 1/12* (2013.01)

(58) Field of Classification Search
USPC .......... 187/233, 242, 272; 212/180, 203, 301, 212/302, 303, 304, 306; 224/518, 519, 524, 224/525, 924, 488, 495, 510, 520, 521; 248/125.8, 159, 354.1, 404, 407; 254/133 A, 2 B, 418, 423, 424, 89 H, 254/93 H, 93 LM, 93 R, 420; 269/69, 71; 280/490.1, 475, 476.1, 477; 414/10, 414/11, 12, 462, 541, 545, 550, 563, 630, 414/472, 540; 52/115, 121, 126.6, 127.2
See application file for complete search history.

(56) References Cited

U.S. PATENT DOCUMENTS

| | | | | |
|---|---|---|---|---|
| 2,497,474 A | * | 2/1950 | Snow | 414/545 |
| 3,048,283 A | * | 8/1962 | Phillips | 414/545 |
| 3,087,626 A | * | 4/1963 | Kimball | 212/203 |
| 3,180,503 A | * | 4/1965 | Shaw | 414/540 |
| 3,879,050 A | * | 4/1975 | Young | 414/540 |
| 4,257,201 A | * | 3/1981 | Landolt et al. | 52/118 |
| 4,325,666 A | * | 4/1982 | Chain et al. | 414/24.5 |
| 4,915,573 A | * | 4/1990 | Wapner et al. | 414/540 |
| 5,011,361 A | * | 4/1991 | Peterson | 414/462 |
| 5,560,628 A | * | 10/1996 | Horn | 280/402 |
| 5,890,739 A | * | 4/1999 | Cogswell, Sr. | 280/769 |
| 5,984,613 A | * | 11/1999 | Motilewa | 414/462 |
| 6,244,813 B1 | * | 6/2001 | Cataldo | 414/462 |
| 6,524,054 B2 | * | 2/2003 | Maney | 414/462 |
| 6,579,055 B1 | * | 6/2003 | Williams | 414/462 |
| 6,863,253 B2 | * | 3/2005 | Valentz et al. | 248/519 |
| 7,243,473 B2 | * | 7/2007 | Terrels | 52/843 |
| 7,350,770 B1 | * | 4/2008 | Boyer | 254/332 |
| 7,997,606 B1 | * | 8/2011 | Sandelius | 280/402 |
| 2002/0005422 A1 | * | 1/2002 | Nusbaum | 224/501 |
| 2007/0065262 A1 | * | 3/2007 | Murphy | 414/462 |
| 2011/0240938 A1 | * | 10/2011 | Lampe et al. | 254/93 R |

* cited by examiner

*Primary Examiner* — Gregory Adams
(74) *Attorney, Agent, or Firm* — Greg L. Martinez

(57) ABSTRACT

A hauler apparatus includes a lower bracket having a first support arm with a first support arm opening extending therethrough. The hauler apparatus includes an upper bracket having a second support arm with a second support arm opening extending therethrough. The hauler apparatus includes a frame arm which extends through the first support arm opening, and has a distal end which terminates within the second support arm opening. The outer shape of the frame arm is different from the inner shape of the first and second support arm openings.

16 Claims, 25 Drawing Sheets

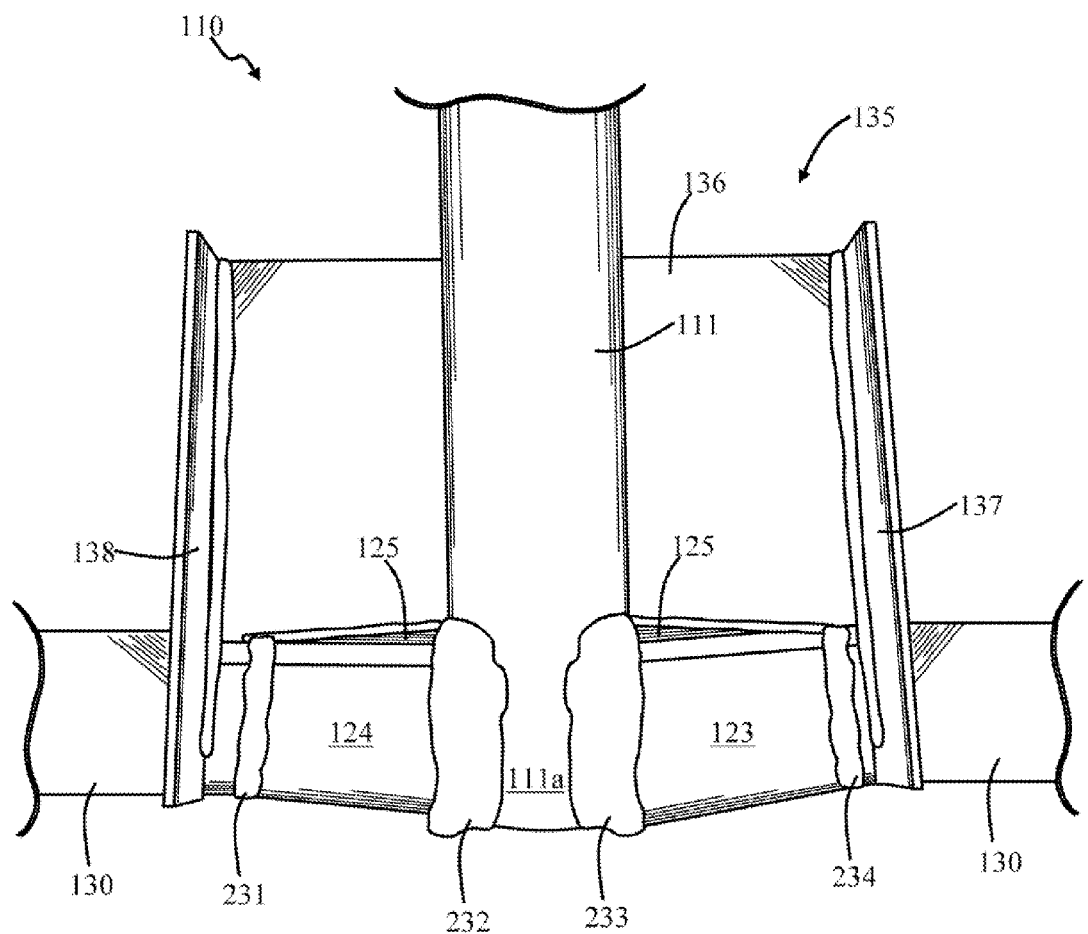

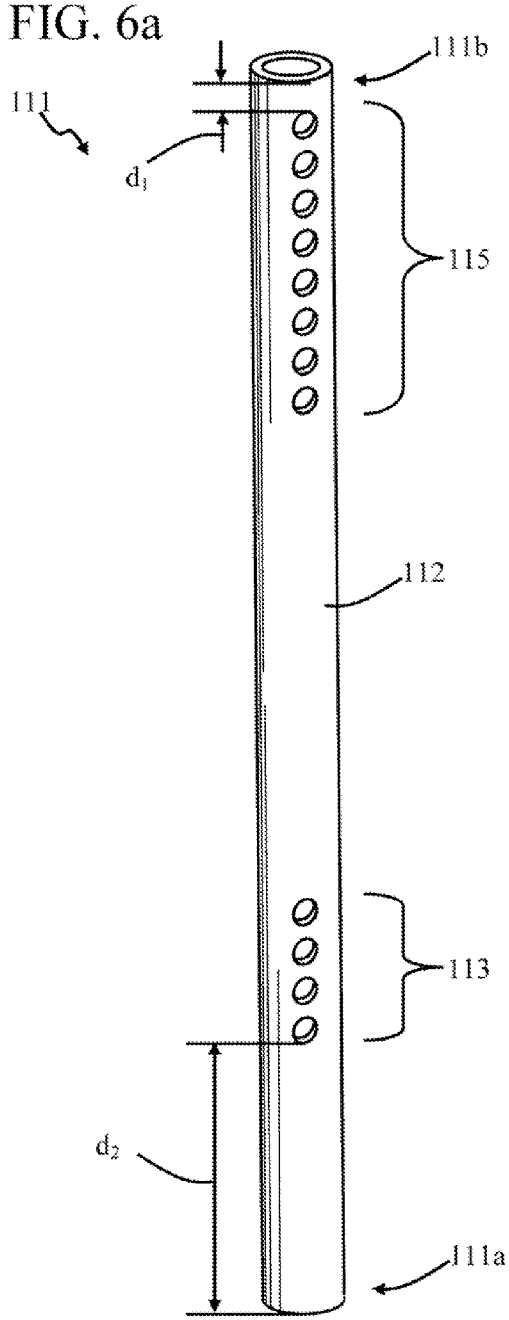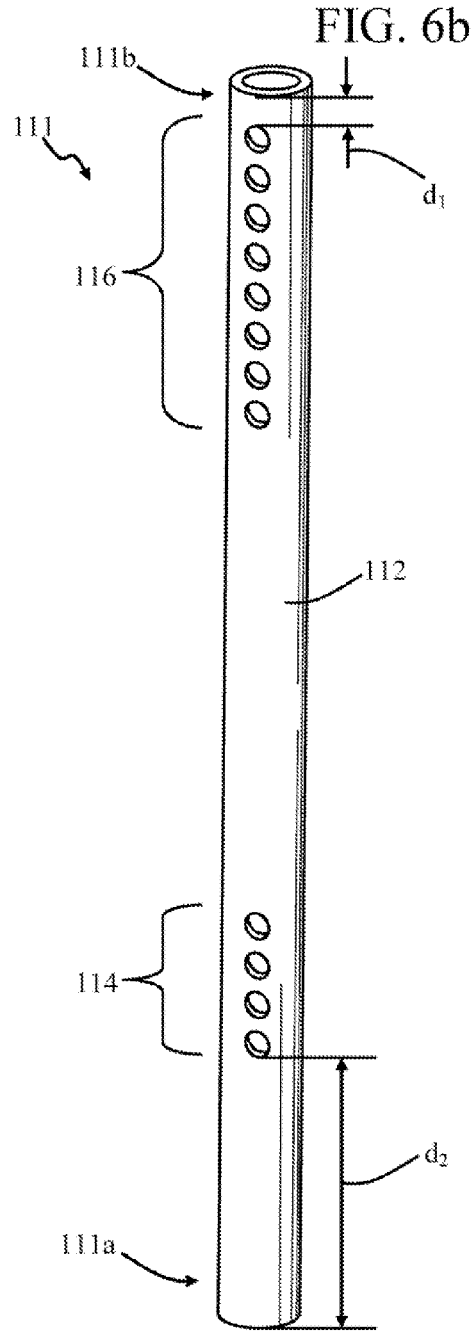

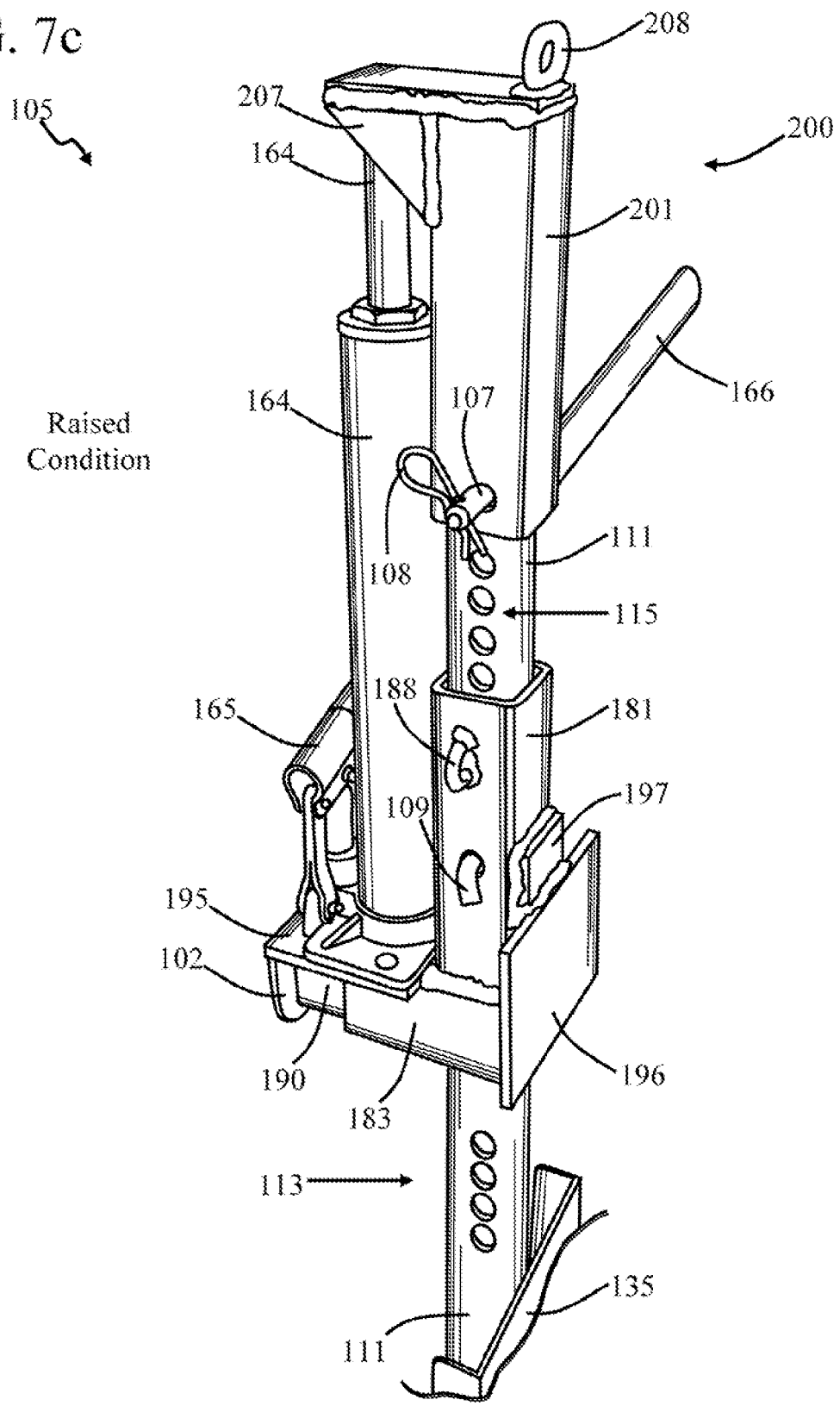

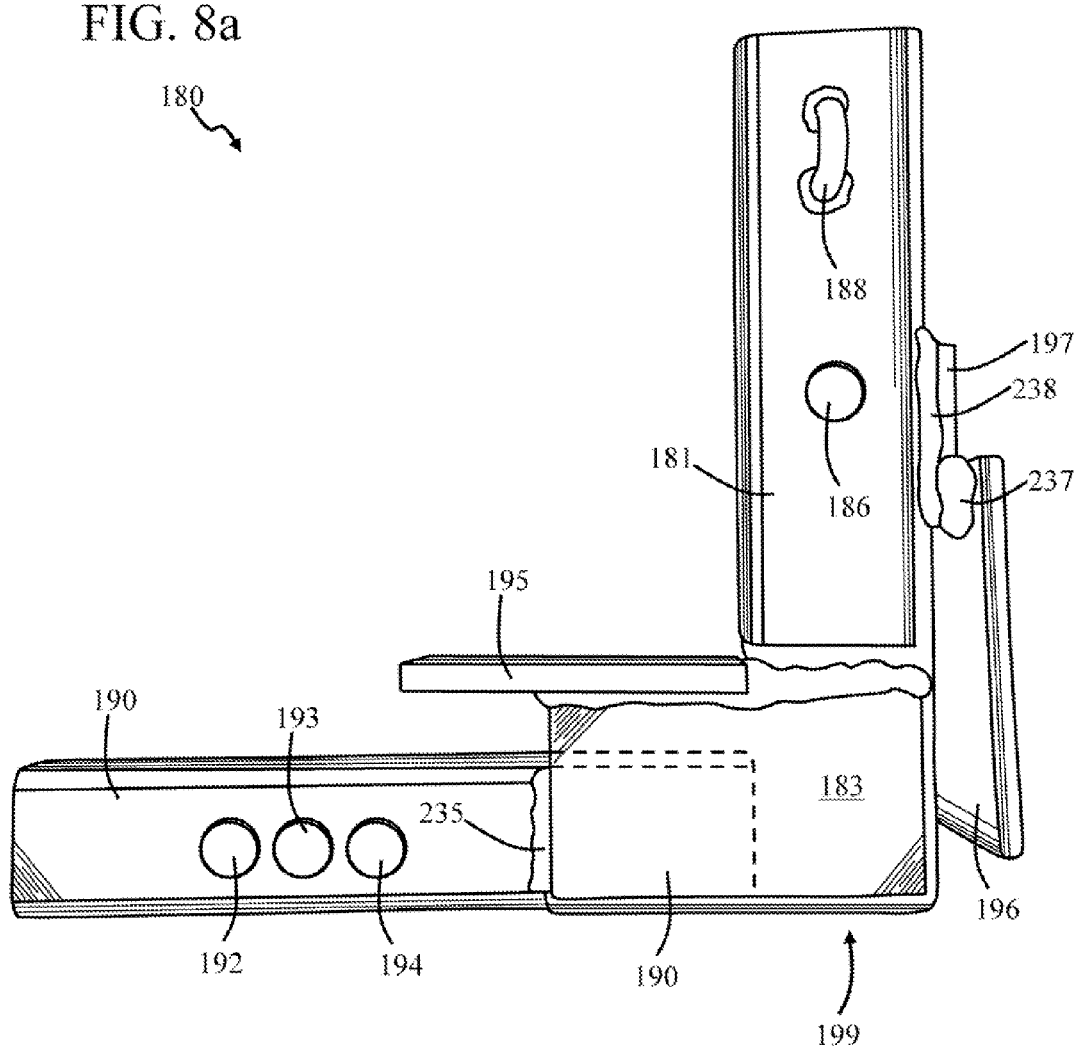

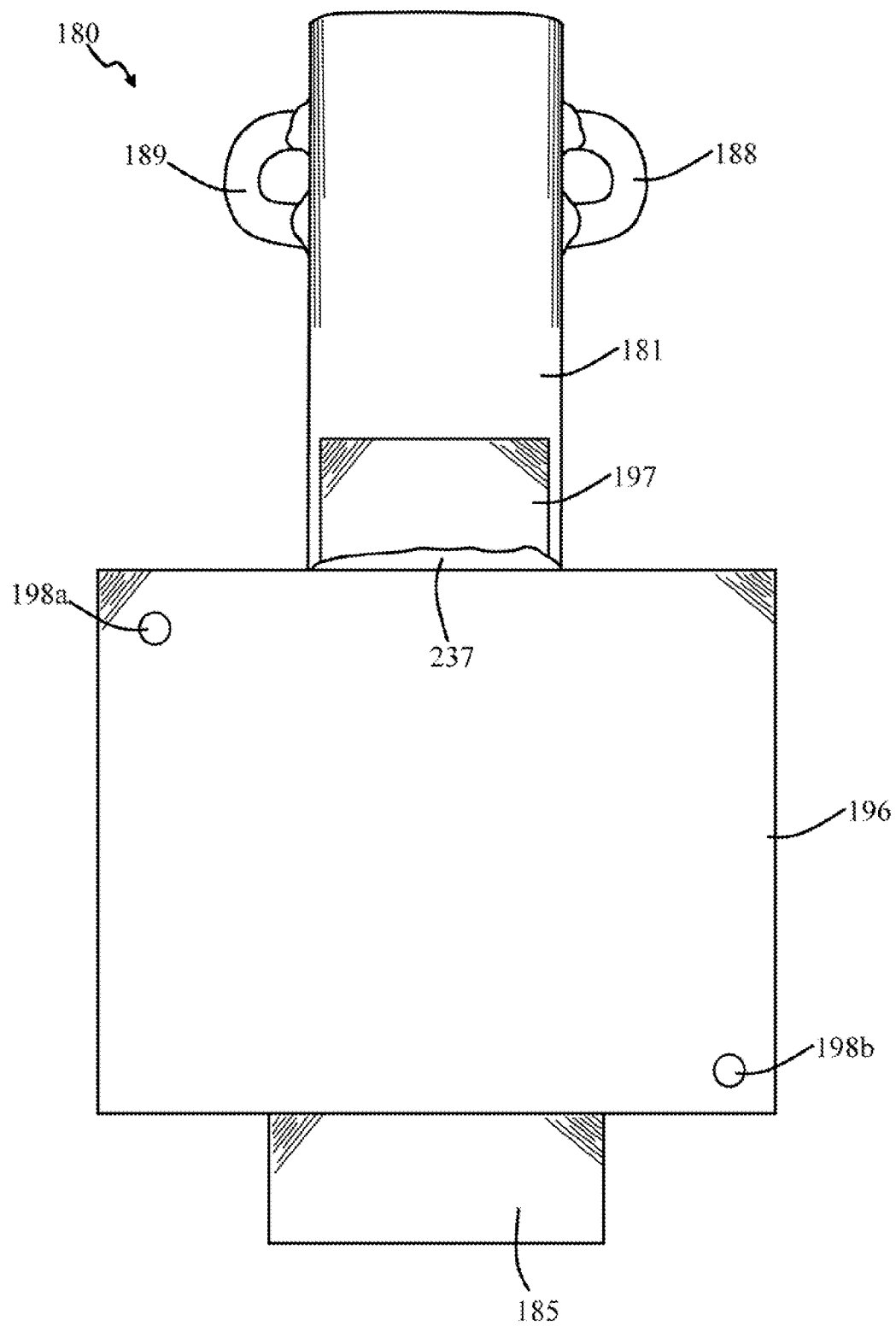

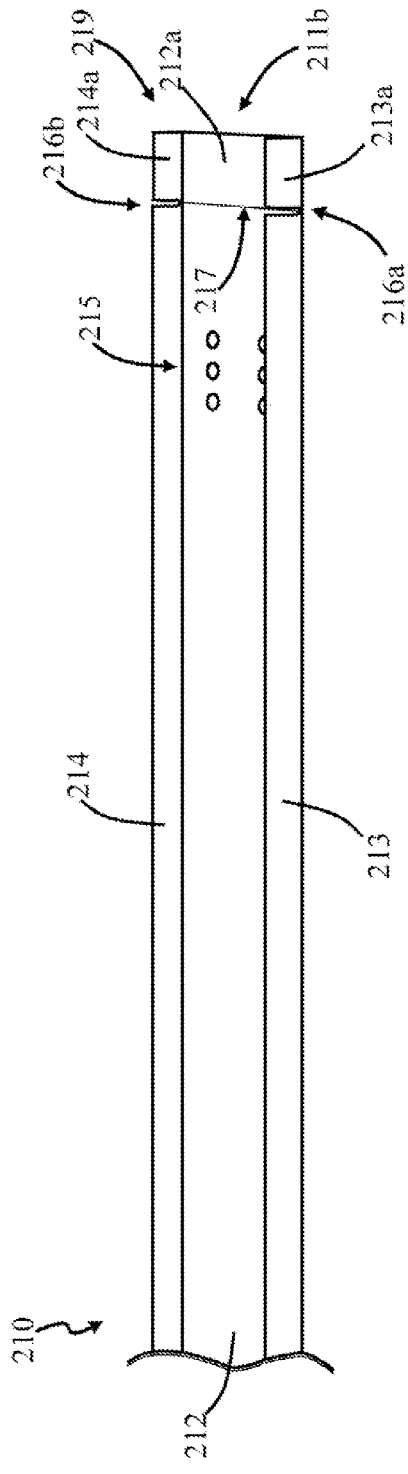
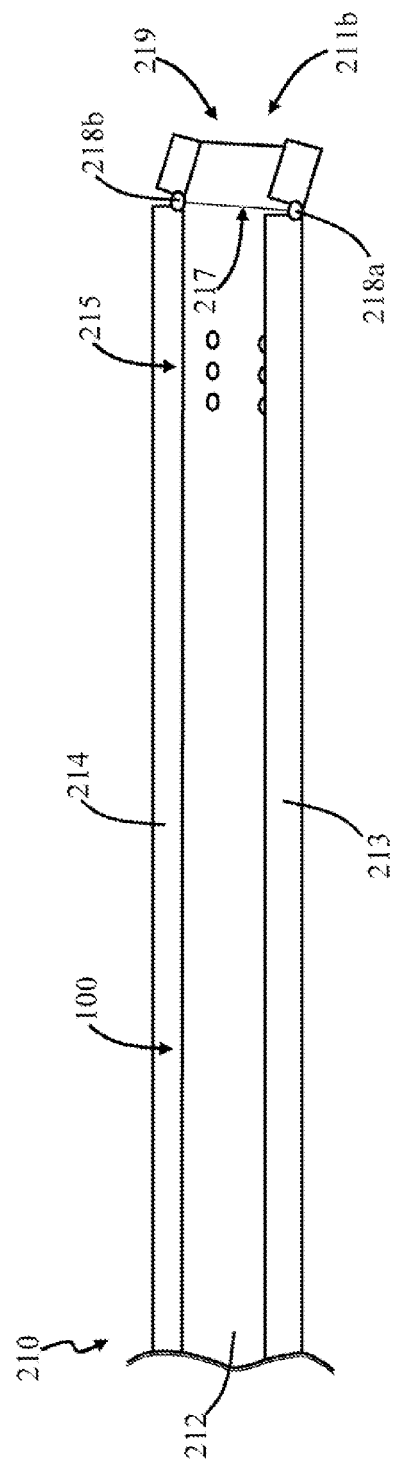
FIG. 10b
FIG. 10c

US 9,017,002 B1

REAR MOUNTED HAULER APPARATUS FOR A VEHICLE

CROSS-REFERENCE TO RELATED APPLICATIONS

This application claims the benefit of U.S. Provisional Application No 61/582,432, entitled "REAR MOUNTED HAULER FOR A VEHICLE", which was filed on Jan. 2, 2012, the contents of which are incorporated by reference as though fully set forth herein.

BACKGROUND OF THE INVENTION

1. Field of the Invention

This invention relates generally to an accessory for a vehicle.

2. Description of the Related Art

Vehicles are often used to carry and haul a load. The vehicle can be of many different types, such as a flatbed truck and a pick-up truck. These types of trucks typically include a truck bed. The load can be of many different types, such as a motorcycle and an all-terrain vehicle, such as a QuadRunner. The appliance can be of many different types, such as a washer, dryer and refrigerator.

These types of loads are often very heavy, so that it is difficult to move them to the truck bed during loading and to move them from the truck bed during unloading. Further, it is often necessary to secure the load to the truck bed to restrict its ability to move during hauling. The load also occupies a significant amount of space of the truck bed, which restricts the ability to haul other loads. Hence, it is desirable to have an apparatus which provides a better way of hauling a load.

BRIEF SUMMARY OF THE INVENTION

The present invention is directed to a hauler apparatus for lifting a load with a vehicle. The novel features of the invention are set forth with particularity in the appended claims. The invention will be best understood from the following description when read in conjunction with the accompanying drawings.

BRIEF DESCRIPTION OF THE DRAWINGS

It should be noted that like reference characters are used throughout the several views of the drawings.

FIG. 5 is a close-up side view of the platform of FIG. 4.

FIGS. 6a and 6b are opposed side views of a frame arm of the hauler apparatus of FIG. 1.

FIG. 7c is an opposed perspective view of the hauler apparatus of FIG. 7b in a raised condition.

FIG. 8a is a side view of a lower bracket of the hauler apparatus of FIG. 1.

FIGS. 8b and 8c are opposed side views of the lower bracket of FIG. 8a.

FIGS. 8d and 8e are top and bottom views, respectively, of the lower bracket of FIG. 8a.

FIGS. 9c and 9d are side views of the upper bracket of FIG. 9a.

FIGS. 10b-10d are perspective views of steps of forming a tapered rail portion proximate to a rail back end of the rail of FIG. 10a.

FIG. 10e is a perspective view of another embodiment of a chock positioned proximate to a rail front end of the rail of FIG. 10a.

DETAILED DESCRIPTION OF THE INVENTION

A lifting device for lifting a load with a vehicle is disclosed, wherein the lifting device is coupled to a vehicle hitch. The lifting device includes a platform which supports the object. The lifting device includes a hydraulic actuator, which is used to move the platform in opposed directions, such as up and down. The load can be of many different types, such as an appliance and motorcycle. The lifting device can include many different types of material, which is provided in many different shapes. For example, some portions of the lifting device include flat stock iron, and other portions include angle iron, which is L-shaped iron. Some portions of the lifting device include channel iron, which is a flat piece of iron with opposed arm portions extending away from opposed edges of the flat piece. Some portions of the lifting device include iron tubing, wherein the iron tubing can be solid iron tubing and hollow iron tubing. Hollow iron tubing has a longitudinal channel extending therethrough. The cross-section of the iron tubing can have many different shapes, such as rectangular, square and circular. The various portions of the lifting device can be coupled together in many different ways, such as by using weldments, wherein a weldment is a welded joint.

Figure 1:
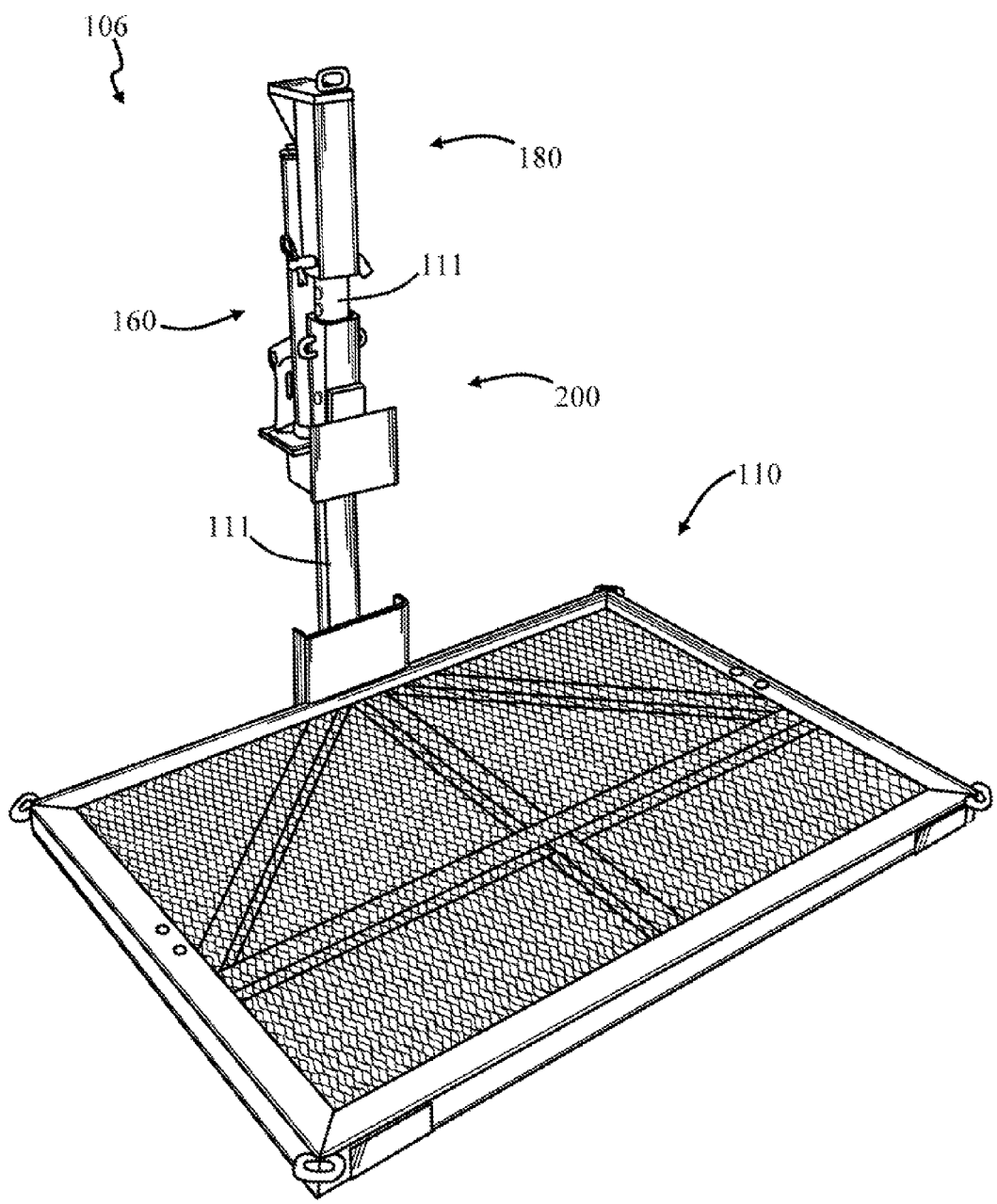
FIG. 1 is a perspective view of a hauler apparatus.
Figure 2:
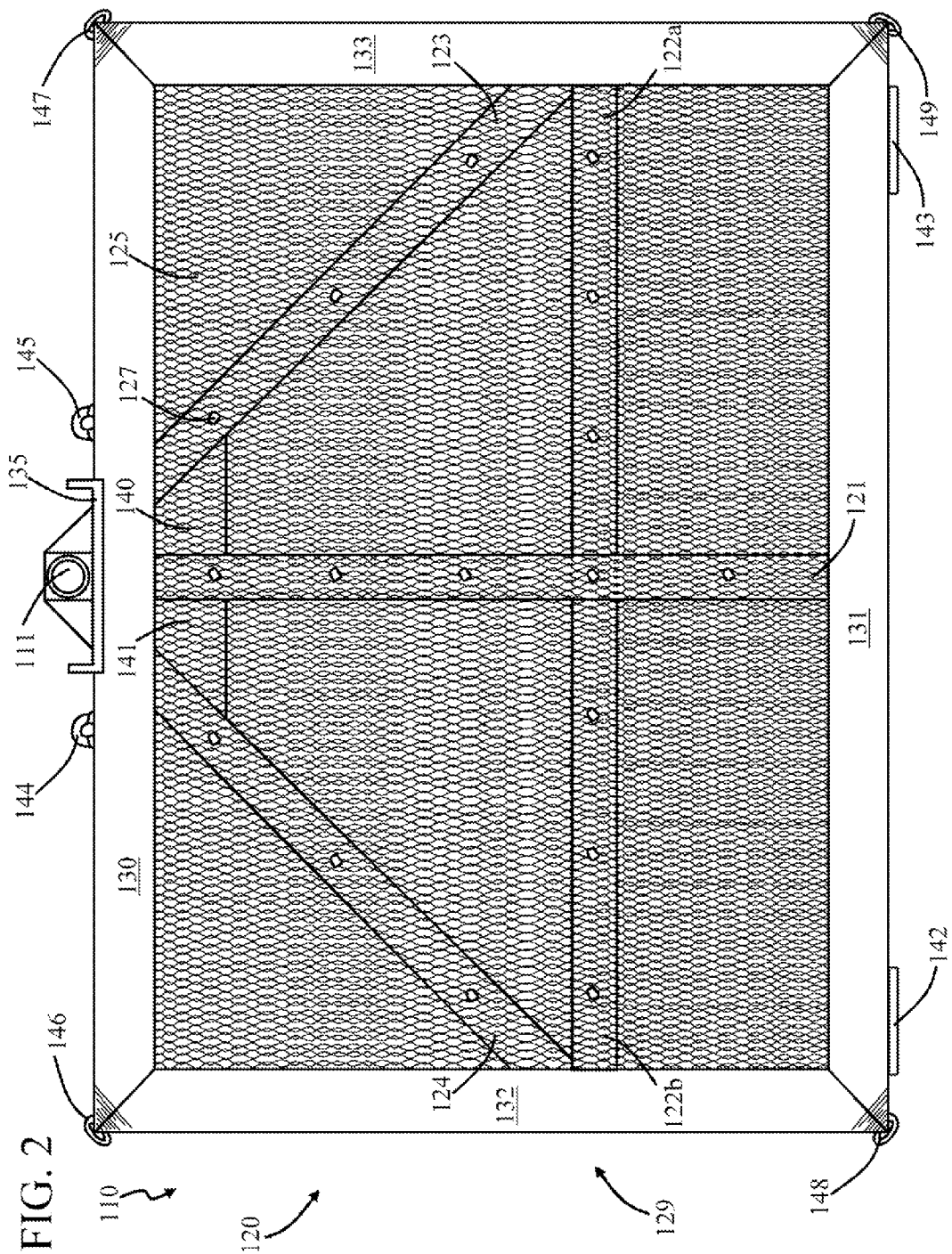
FIG. 2 is a top view of the hauler apparatus of FIG. 1.
Figure 3:
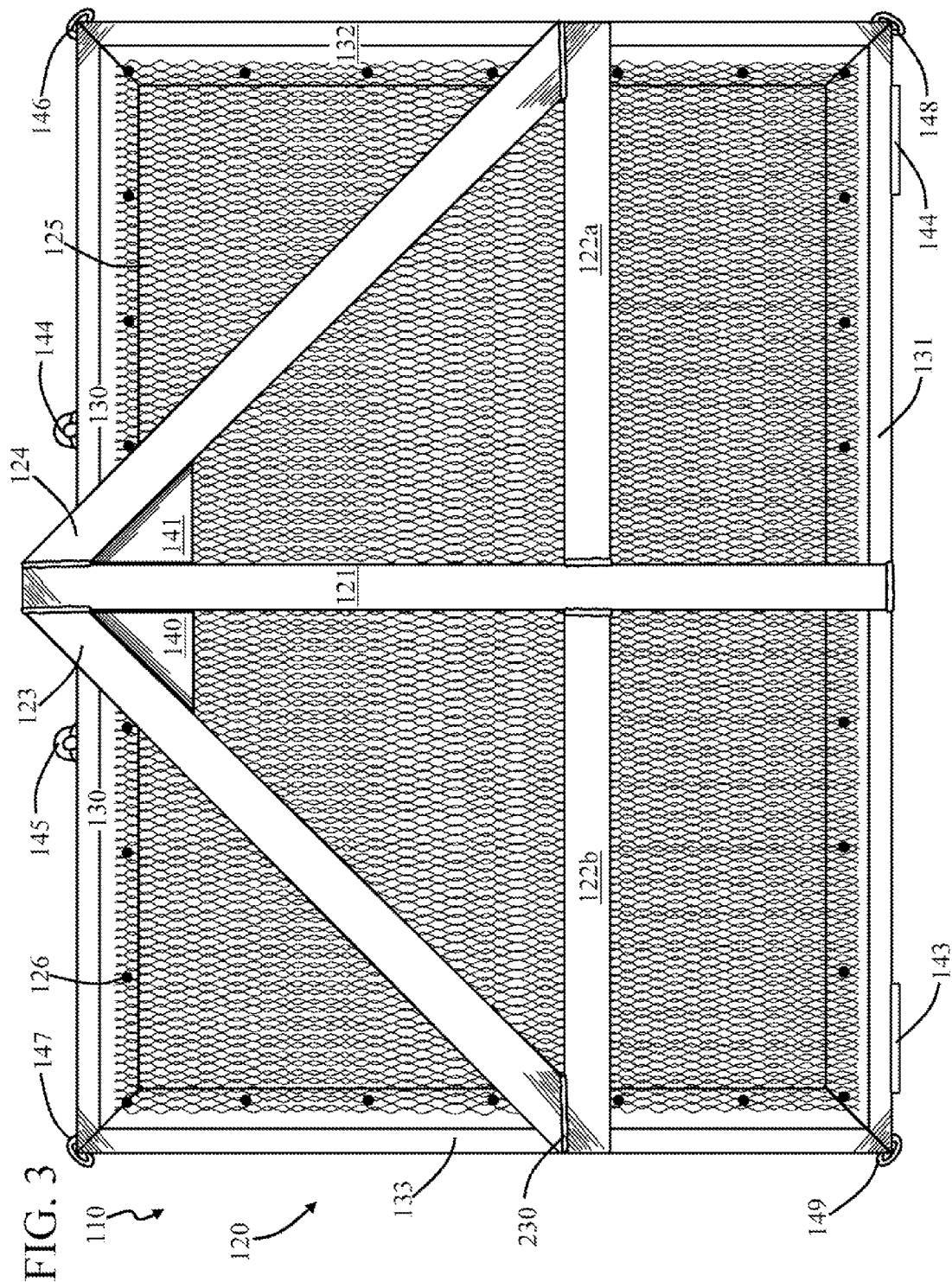
FIG. 3 is a bottom view of the hauler apparatus of FIG. 1.
Figure 4:
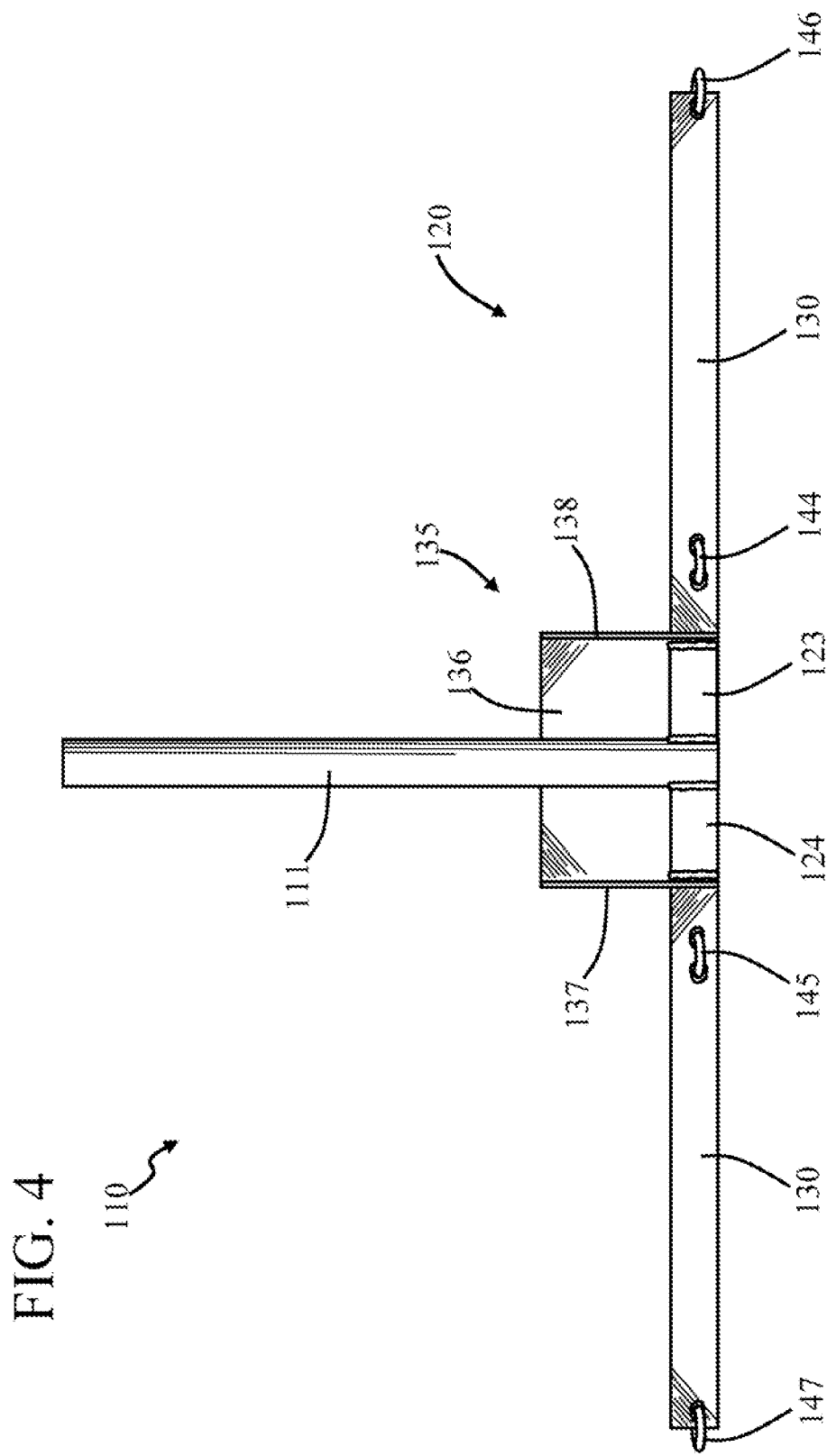
FIG. 4 is a side view of a platform of hauler apparatus of FIG. 1.

FIG. 1 is a perspective view of a hauler apparatus 105, and FIGS. 2 and 3 are top and bottom views, respectively, of hauler apparatus 105. FIG. 4 is a side view of a platform 110 included with hauler apparatus 105. In this embodiment, platform 110 is coupled to a lower bracket 180 and an upper bracket 200 through a frame arm 111. Lower bracket 180 carries a lifting device 160, which is used to move platform 110 in opposed directions, such as up and down.

In this embodiment, platform 110 includes a platform frame 120. In this embodiment, platform 110 includes a frame arm 111 and a longitudinal frame member 121, which extends outwardly from a distal end 111b (FIG. 1) of frame arm 111. Platform 110 includes angled frame members 123 and 124, which are connected to longitudinal frame member 121 proximate to frame arm 111. FIG. 5 is a close-up side view of platform 110, and shows frame arm 111 coupled to proximal ends of longitudinal frame member 121 and angled frame members 123 and 124. Frame arm 111 can be coupled to longitudinal frame member 121 and angled flame members 123 and 124 in many different ways. In this embodiment, frame arm 111 is coupled to angled frame members 123 and 124 with weldments 233 and 232, respectively. Frame arm 111 is also coupled to longitudinal frame member 121 with a weldment, which cannot be seen in the view of FIG. 5.

In this embodiment, and as shown in FIG. 3, platform 110 includes a support plate 140 coupled between longitudinal frame member 121 and angled frame member 123 and a support plate 141 coupled between longitudinal frame member 121 and angled frame member 124. Support plate 140 provides support between longitudinal frame member 121 and angled frame member 123 to restrict the ability of longitudinal frame member 121 and angled frame member 124 to move relative to each other. Further, support plate 141 provides support between longitudinal frame member 121 and angled frame member 124 to restrict the ability of longitudinal frame member 121 and angled frame member 124 to move relative to each other. Support plate 140 can be coupled to longitudinal frame member 121 and angled frame member 123 in many different ways, such as by using a weldment. Further, support plate 141 can be coupled to longitudinal frame member 121 and angled frame member 124 in many different ways, such as by using a weldment.

In this embodiment, platform 110 includes transverse frame members 122a and 122, wherein transverse frame member 122a extends through the distal end of angled frame member 123 and longitudinal frame member 121. Transverse frame member 122a is coupled to longitudinal frame member 121 at an intermediate position, for illustrative purposes. In some embodiments, transverse frame member 122a is coupled to longitudinal frame member 121 at a distal end of longitudinal frame member 121.

It should be noted that transverse frame members 122a and 122b can be a single piece or a plurality of pieces. For example, the transverse frame member of platform 110 includes transverse frame members 122a and 122a. transverse frame members 122a and 122b can have many different shapes. In this embodiment, transverse frame members 122a and 122b are channel iron. However, in other embodiments, transverse frame members 122a and 122b include another shape of iron, such as L-shaped iron.

In this embodiment, platform frame 120 includes an outer frame 129, wherein outer frame 129 includes proximal and distal frame members 130 and 131, and opposed side frame members 132 and 133. In this embodiment, frame members 130, 131, 132 and 133 are coupled together so that outer frame 129 is rectangular in shape. In this embodiment, and as shown in FIG. 5, proximal frame member 130 is coupled to angled frame member 124 with a weldments 231 proximate to proximal end 111a of frame arm 111. Further, proximal frame member 130 is coupled to angled frame member 123 with a weldments 234 proximate to proximal end 111a of frame arm 111.

Proximal frame member 130 is carried by longitudinal frame member 121 and angled frame members 123 and 124. Distal frame member 131 is carried by longitudinal frame member 121 at the distal end thereof. Side frame member 132 is carried by longitudinal frame member 121 and angled frame member 124. Side frame member 133 is carried by longitudinal frame member 121 and angled frame member 123.

In this embodiment, side frame member 132 is coupled to one end of proximal frame member 130, and side frame member 133 is coupled to an opposed end of proximal frame member 130. An intermediate portion of side frame 132 is coupled to angled frame member 124 and transverse frame member 122b. Side frame member 132 is coupled to one end of distal frame member 131, and side frame member 133 is coupled to an opposed end of distal frame member 131. An intermediate portion of side frame 133 is coupled to angled frame member 123 and transverse frame member 122a.

It should be noted that the various components of platform frame 120 can be coupled together in many different ways, such as by using, a fastener, weldments and combinations thereof. In this embodiment, the various components of platform frame 120 are coupled together using weldments. For example, as shown in FIG. 3, a weldment 230 couples angled frame member 123 and transverse frame member 122b together.

In this embodiment, platform 110 includes a friction plate 135 positioned proximate to proximal end 111a of frame arm 111. In particular, friction plate 135 is carried by proximal frame member 130 and extends upwardly therefrom. Friction plate 135 includes a main friction plate member 136 and opposed friction plate arms 137 and 138, which extend outwardly from opposed side edges of main friction plate member 136. Friction plate arms 137 and 138 extend away from proximal frame member 130, as best seen in FIGS. 2 and 5. in some embodiments, opposed friction plate anus 137 and 138 and main friction plate member 136 include flat stock material coupled together, such as with welding. In other embodiments, opposed friction plate arms 137 and 138 and main friction plate member 136 are a single integral piece of channel iron. Friction plate 136 will be discussed in more detail below.

Platform frame 120 can include many different types of materials in many different shapes. For example, platform frame 120 can include flat stock iron, angle iron, channel iron, rectangular iron tubing, circular iron tubing, and combinations thereof. In some embodiments, support plates 140 and 141 include flat stock iron. In some embodiments, frame arm 111 includes circular tubing iron. In some embodiments, outer frame 129 includes angle iron. In some embodiments, longitudinal frame member 121 includes rectangular tubing iron. in some embodiments, longitudinal frame member 121 includes rectangular tubing iron. In some embodiments, angled frame members 123 and 124 include rectangular tubing iron, in some embodiments, angled frame members 123 and 124 include rectangular tubing iron.

Platform 110 includes a platform mesh 125, which is coupled to platform frame 120. In particular, platform mesh 125 is coupled to proximal frame member 130, distal frame member 131 and side frame members 132 and 133. Platform mesh 125 can be of many different types of material. In this embodiment, platform mesh 125 is a metal mesh. One type of metal mesh is often referred to as expanded metal and is manufactured by McNichols Company. In this embodiment, platform mesh 125 is coupled to platform frame 120 with fasteners 126. Fasteners 126 can be of many different types, such as a threaded fastener. Some portions of platform mesh 125 can be coupled to platform frame 120 with weldments 127, or a combination of fasteners 126 and weldments. In this embodiment, portions of platform mesh 125 are coupled to longitudinal frame member 121, transverse frame members 122a and 122b, and angled frame members 123 and 124 with weldments 127, as shown in FIG. 2. Weldments 127 reduce the movement of platform mesh 125 when vehicle 100 is in motion.

In this embodiment, platform 110 includes a loop anchor, which is useful to hold an elongate member. The elongate member can be of many different types, such as a chain, rope and strap, among others. The elongate member is useful to secure the load to platform 110. the loop anchor can be positioned at many different locations. In this embodiment, platform 110 includes loop anchors 144 and 145 coupled to proximal frame member 130 at opposed sides of longitudinal frame member 121. In this embodiment, platform 110 includes a loop anchor 146 proximate to the intersection of proximal frame member 130 and side frame member 132. Platform 110 includes a loop anchor 147 proximate to the intersection of proximal frame member 130 and side frame member 133. Platform 110 includes a loop anchor 148 proximate to the intersection of distal frame member 131 and side frame member 132. Platform 110 includes a loop anchor 149 proximate to the intersection of distal frame member 131 and side frame member 133. It should be noted that loop anchors can be positioned at other locations, if desired, such as along the length of distal frame member 131 and along the lengths of side frame members 132 and 133.

Platform 110 includes a safety reflector which reflects incident light for road safety. In this embodiment, platform 110 includes safety reflectors 142 and 143 which are carried by distal frame member 131. Safety reflectors 142 and 143 face away from proximal frame member 130 so they reflect light away from proximal frame member 130. If desired, platform 110 can include corresponding reflectors coupled to side frame members 132 and 133.

FIGS. 6a and 6b are opposed side views of a frame arm 111 of the hauler apparatus 105 of FIG. 1. In this embodiment, frame arm 111 is a hollow member with a circular cross-section, which is often referred to as "round tubing" and "circular tubing iron". The length of frame arm 111 can have many different length values, and typically depends on the size of vehicle 100. In general, the length of frame arm 111 increases and decreases as the size of vehicle 100 increases and decreases, respectively. In this embodiment, the length of frame arm 111 is about thirty six inches.

Frame arm 111 includes a pair of through holes proximate to distal end 111b, and a pair of through holes positioned proximate to proximal end 111a. In this embodiment, frame arm 111 includes a plurality of through holes 113 (FIG. 6a) proximate to proximal end 111a and a corresponding plurality of through holes 114 (FIG. 6b) proximate to proximal end 111a. Through holes 113 and 114 are aligned with each other so that an elongate member, such as a first locking pin, can extend therethrough corresponding through holes. In this embodiment, the through hole of plurality of through holes 113 and 114 closest to proximal end 111a is about nine and one half inches from proximal end 111a. The distance between proximal end 111a and the through hole of the plurality of through holes 113 and 114 closest to proximal end 111a is denoted as $d_2$, and, in this embodiment, is equal to about nine and one half inches.

In this embodiment, frame arm 111 includes a plurality of through holes 115 (FIG. 6a) proximate to distal end 111b and a corresponding plurality of through holes 116 (FIG. 6b) proximate to distal end 111b. Through holes 115 and 116 are aligned with each other so that an elongate member, such as a second locking pin, can extend therethrough corresponding through holes. In this embodiment, the through hole of plurality of through holes 115 and 116 closest to distal end 111b is about two inches from distal end 111b. The distance between distal end 111b and the through hole of the plurality of through holes 115 and 116 closest to distal end 111b is denoted as $d_1$, and, in this embodiment, is equal to about two inches. Information regarding the through holes of frame arm 111 and the first and second locking pins will be provided in more detail below.

Figure 7A:
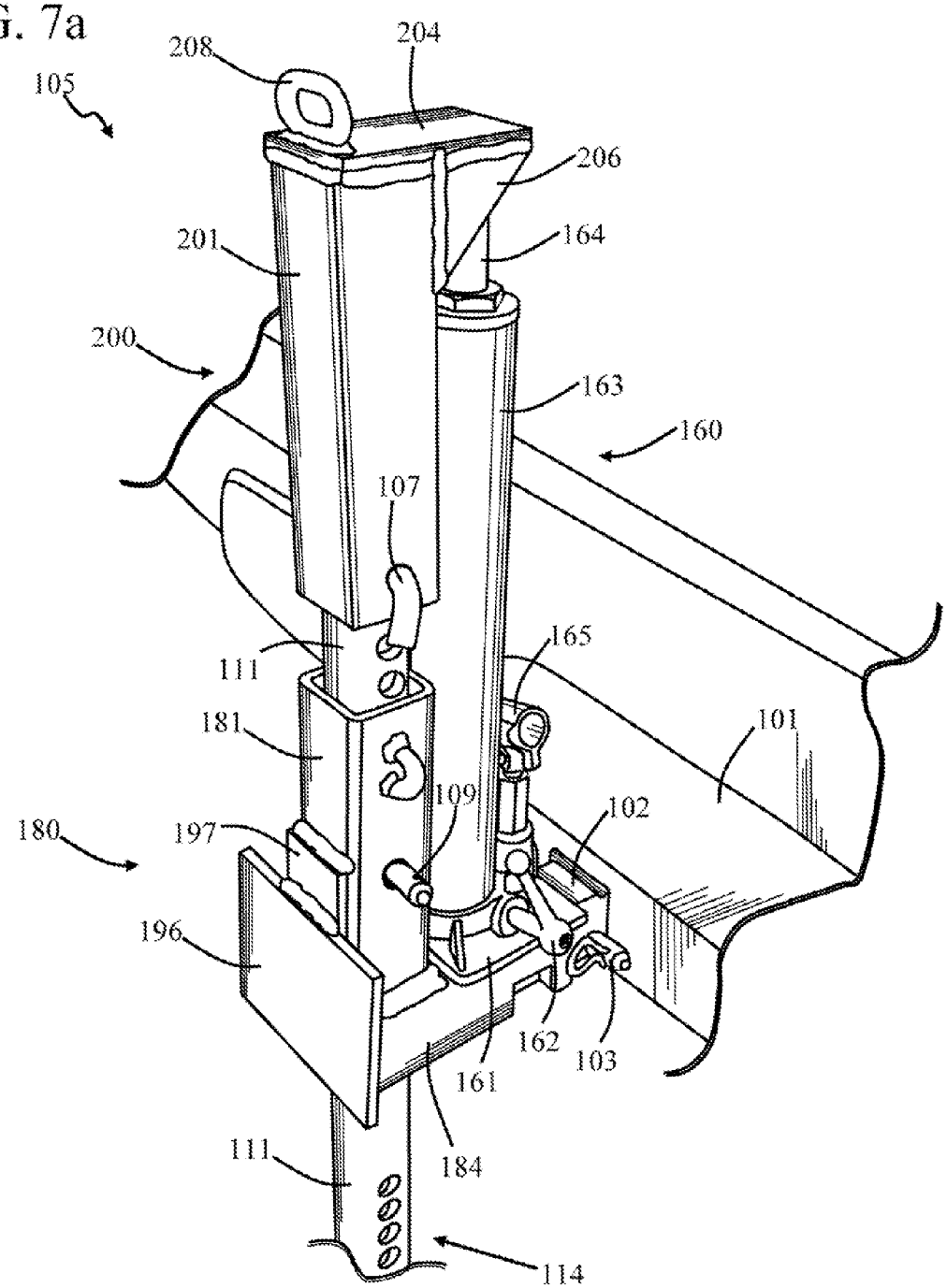
FIG. 7a is a view of the hauler apparatus of FIG. 1 carried by a vehicle.
Figure 7B:
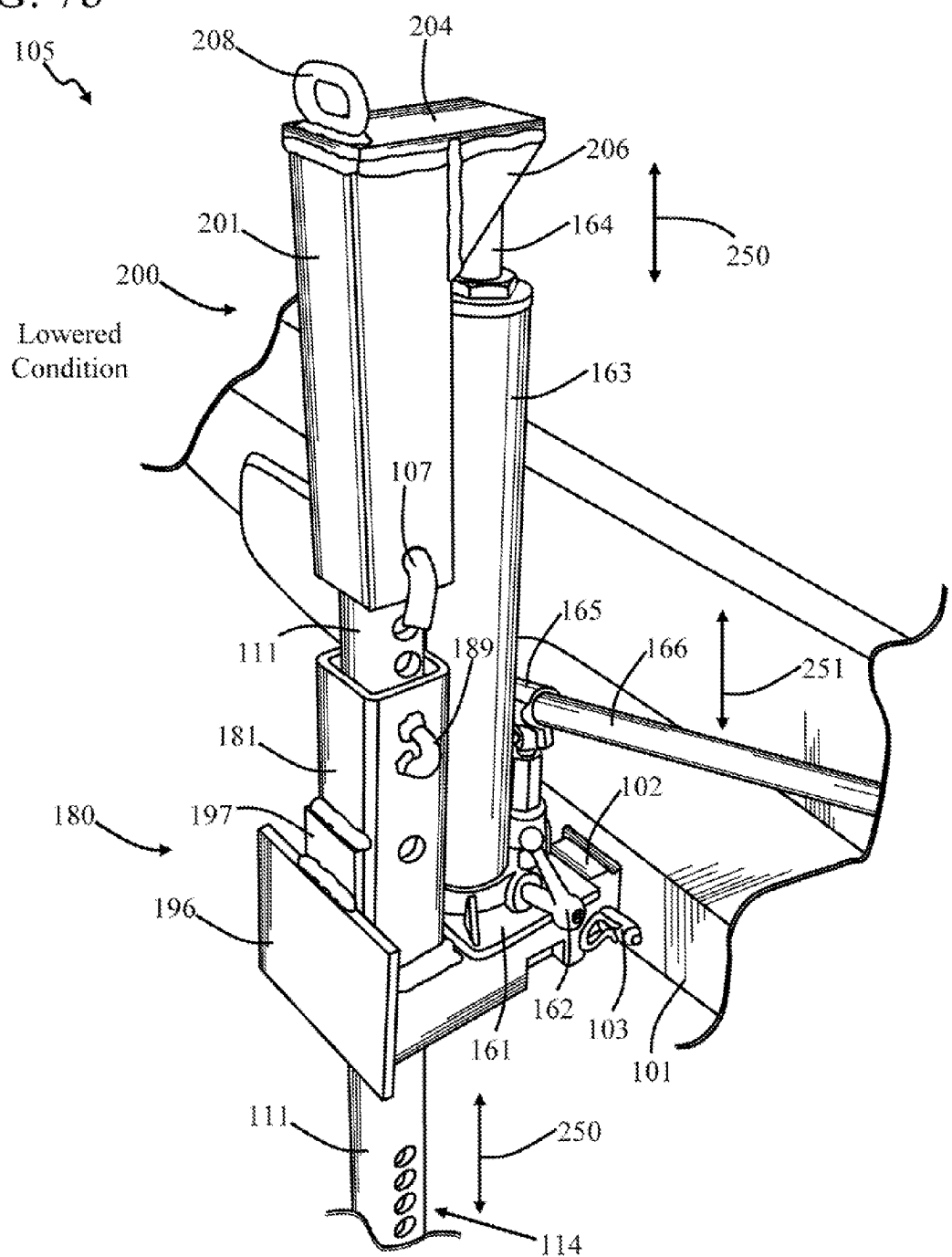
FIG. 7b is a perspective view of the hauler apparatus of FIG. 7a in a lowered condition.

FIG. 7a is a view of hauler apparatus 105 of FIGS. 1-6 carried by a vehicle 100. FIG. 7b is a perspective view of hauler apparatus 105 of FIG. 7a in a lowered condition, and FIG. 7c is an opposed perspective view of hauler apparatus 105 of FIG. 7b in a raised condition. In this embodiment, frame arm 111 extends through lower bracket 180 and upper bracket 200. A locking pin 107 extends through upper bracket 200 and frame arm 111 so that upper bracket 200 and frame arm 111 are locked together. If desired, a cotter pin 108 can be extended through locking pin 107, as shown in FIG. 7c, to hold locking pin 107 in place. A locking pin 109 extends through lower bracket 180 and frame arm 111 so that lower bracket 180 and frame arm 111 are locked together. It should be noted that, when it is desired to move hauler apparatus 105 between the raised and lowered conditions, locking pin 109 is removed from lower bracket 180, as shown in FIG. 7b. Lower bracket 180 will be discussed in more detail with FIGS. 8a-8e and upper bracket will be discussed in more detail with FIGS. 9a-9d.

In this embodiment, lifting device 160 includes a hydraulic cylinder 163 and hydraulic cylinder arm 164, and an actuator socket 165 operatively coupled to hydraulic cylinder 163 and hydraulic cylinder arm 164. As will be discussed in more detail below, lifting device 160 is actuated in response to moving actuator socket 165. Actuator socket 165 can be moved in many different ways. In this embodiment, and as shown in FIGS. 7b and 7c, an actuator handle 166 is coupled to actuator socket 165. Lifting device 160 is actuated in response to moving actuator handle up and down.

Lifting device 160 is carried by lower bracket 180 and engaged with upper bracket 200. In particular, hydraulic cylinder 163 is engaged with lower bracket 180 and hydraulic cylinder arm 164 is engaged with upper bracket 200. In operation, upper bracket 200 moves in response to actuating lifting device 160. In particular, upper bracket 200 moves away from lower bracket ISO in response to actuating lifting device 160. Hauler apparatus 105 is in the raised condition in response to moving upper bracket 200 away from lower bracket 180. Further, upper bracket 200 moves towards lower bracket 180 in response to actuating lifting device 160. Hauler apparatus 105 is in the lowered condition in response to moving upper bracket 200 towards lower bracket 180.

Figure 8C:
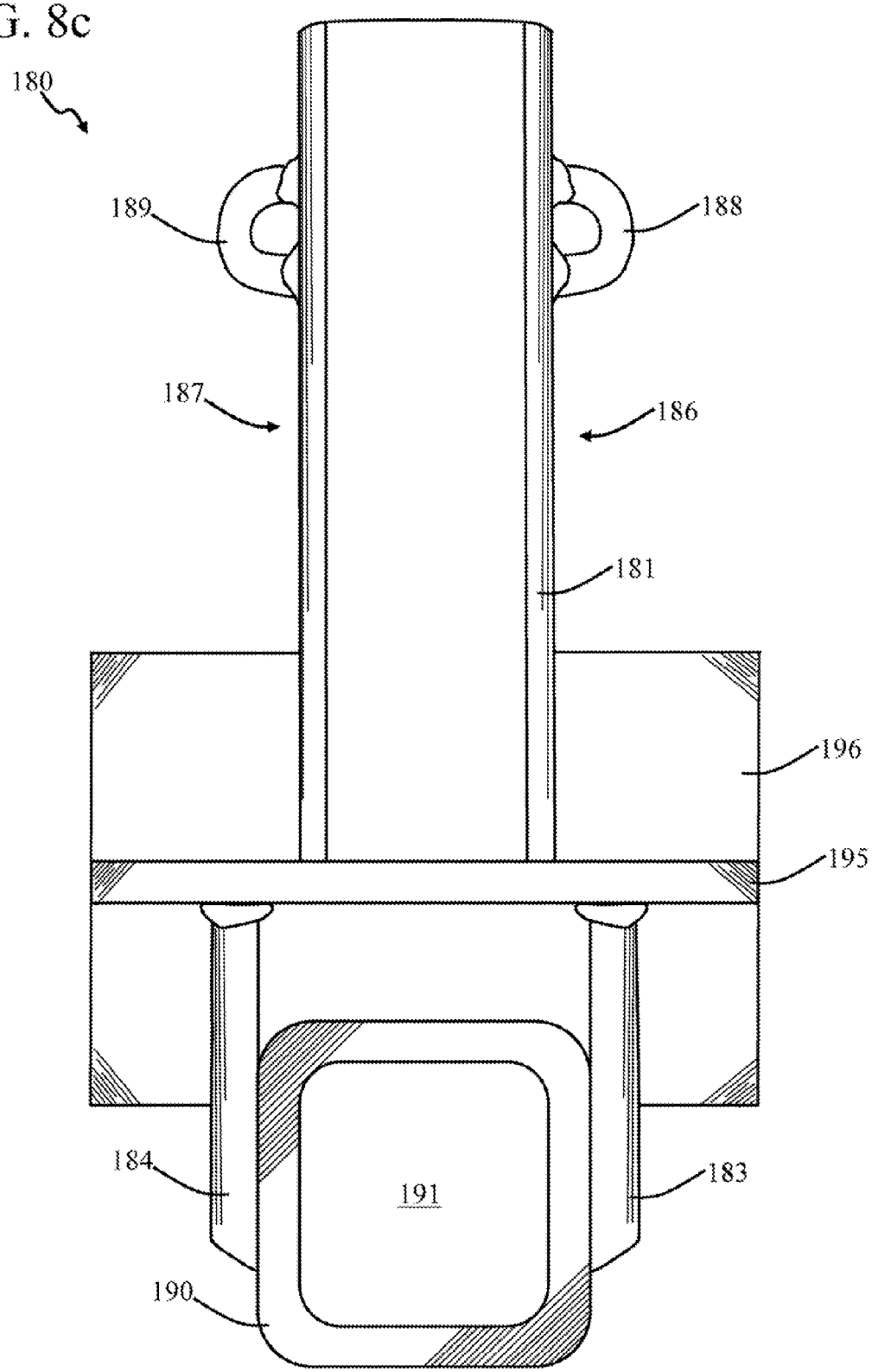
Figure 8D:
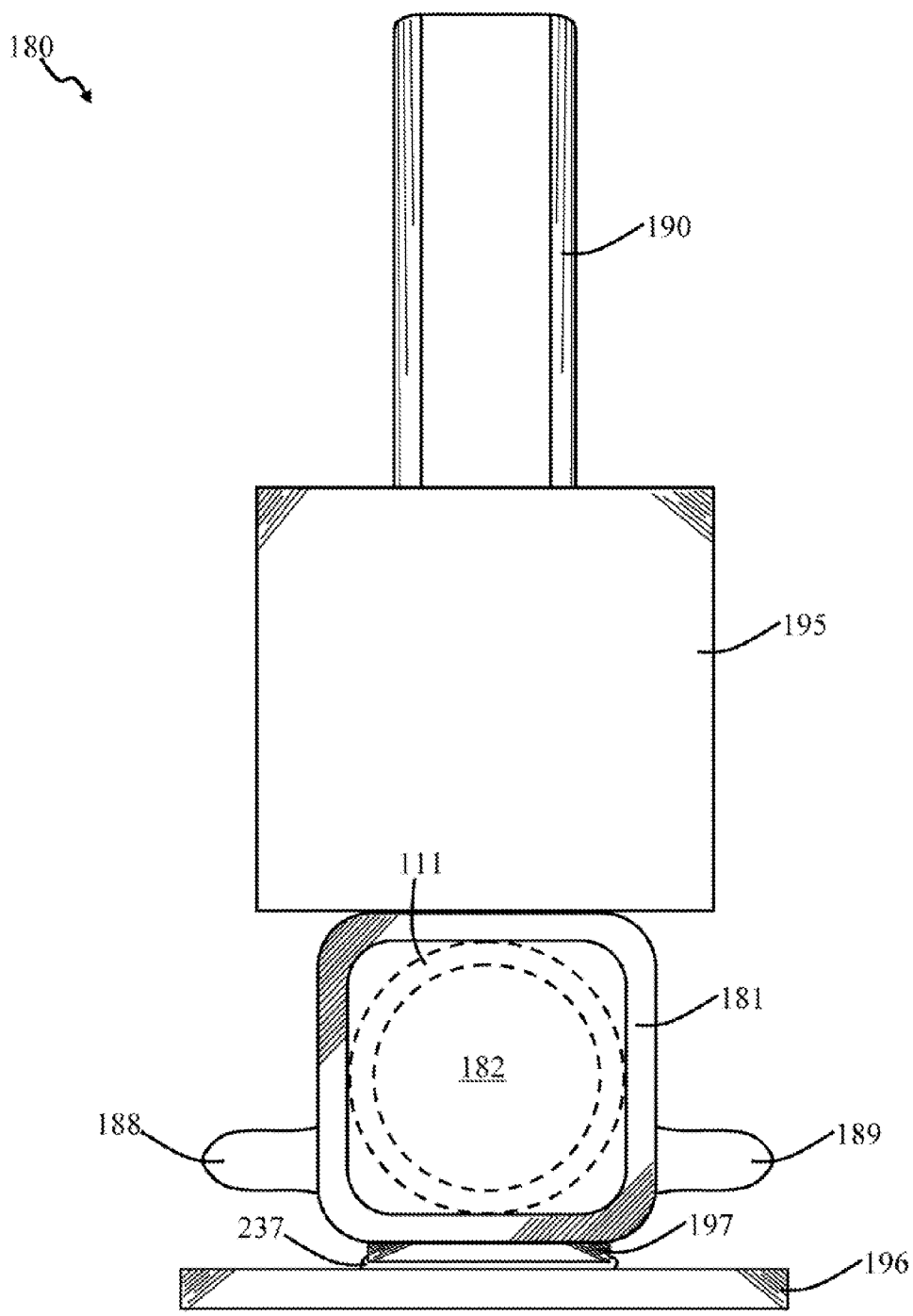
Figure 8E:
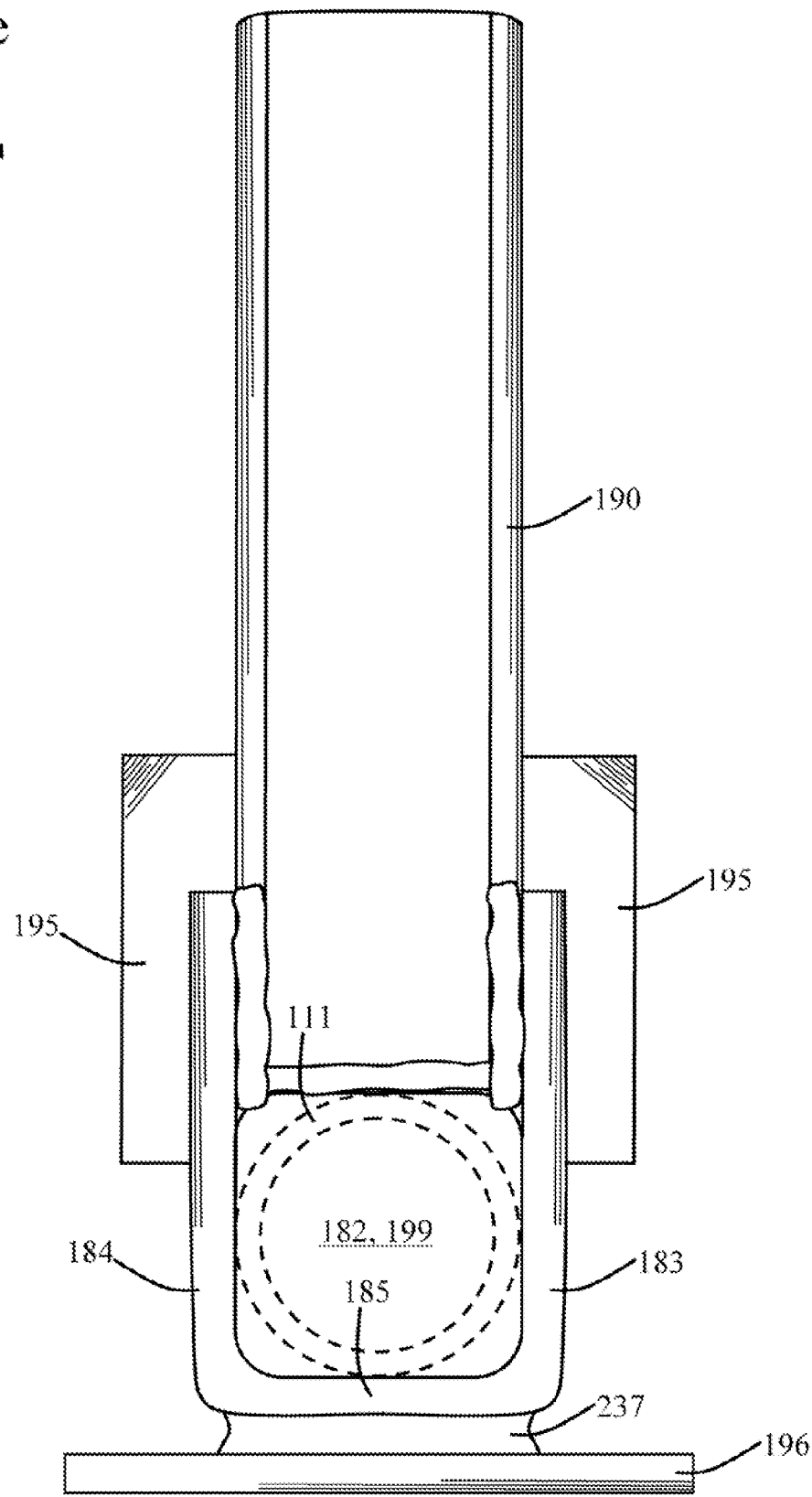

FIG. 8a is a side view of a lower bracket 180 of hauler apparatus 105 of FIG. 1, and FIGS. 8b and 8c are opposed side views of lower bracket 180 of FIG. 8a. FIGS. 8d and 8e are top and bottom views, respectively, of lower bracket 180 of FIG. 8a. It should be noted that the various components of lower bracket 180 can be coupled together in many different ways, such as by using fasteners and weldments. In this embodiment, the various components of lower bracket 180 are coupled together using weldments, such as a weldment 235.

In this embodiment, lower bracket 180 includes opposed projecting arms 183 and 184 (FIG. 8c) coupled to projecting arm plate 185 (FIG. 8b). In some embodiments, projecting arms 183 and 184 and projecting arm plate 185 include flat stock material coupled together, such as with welding. In other embodiments, projecting arms 183 and 184 and projecting arm plate 185 are a single integral piece of channel iron.

In this embodiment, lower bracket 180 includes a support arm 181 carried by projecting arms 183 and 184 and projecting arm plate 185. Support arm 181 is a piece of tubular metal with a support arm opening 182 extending therethrough. Support arm opening 182 can have many different cross-sectional shapes. In this embodiment, support arm opening 182 has a non-circular cross-sectional shape. In particular, support arm opening 182 has a squarish cross-sectional shape with rounded corners. The shape of support arm opening 182 is chosen to provide a desired amount of friction between the inner portion of support arm 181 and frame arm 111, wherein frame arm 111 is shown in phantom in FIG. 8e. In general, the amount of friction between frame arm 111 and the inner portion of support arm 181 increases as the cross-sectional shape of support arm opening 182 becomes more circular and the size matches the inner dimensions of support arm 181. Further, the amount of friction between support arm opening 182 and the inner portion of support arm 181 decreases as the cross-sectional shape of support arm opening 182 becomes less circular. This feature of hauler apparatus 105 will be discussed in more detail below in FIGS. 8f, 8g, 8h and 8i.

Support arm 181 includes opposed through holes 186 and 187 (FIG. 8c) which are aligned with each other so that a locking pin can extend therethrough, if desired. The locking pin is aligned with corresponding through holes of frame arm 111 to hold frame arm 111 at a desired position relative to support arm 181.

Support arm 181 includes opposed loop anchors 188 and 189 positioned on opposed sides thereof, as shown in FIG. 8b. Loop anchors 188 and 189 are useful to receive the elongate member discussed in more detail above with platform 110. In particular, loop anchors 188 and 189 are useful to help secure the load to platform 110.

In this embodiment, lower bracket 180 includes a hitch arm 190, which is coupled to projecting arms 183 and 184 (FIG. 8c) and received by vehicle hitch 102 (FIGS. 7a and 7b). In this embodiment, hitch arm 190 is a tubular metal with a hitch arm opening 191 extending therethrough. Hitch arm 190 includes a plurality of opposed through holes, some of which are denoted as through holes 192, 193 and 194 in FIG. 8a. Through holes are sized and shaped to receive locking pin 103 to lock hitch arm 190 to vehicle hitch 102, as shown in FIGS. 7a and 7b.

As shown in FIGS. 8a and 8e, lower bracket 180 includes a projecting arm opening 199, which is bounded by opposed projecting arms 183 and 184 and projecting arm plate 185, as well as hitch arm 190. Projecting arm opening 199 is aligned with support arm opening 182 so that frame arm 111 can extend therethrough projecting arm opening 199 and support arm opening 182, as will he discussed in more detail below with FIGS. 8f-8i.

In this embodiment, lower bracket 180 includes lifting device platform 195, which carries hauler apparatus 105, as shown in FIGS. 7a, 7b and 7c. Lifting device platform 195 is carried by projecting arms 183 and 184 sand extends away from support arm 181 and above hitch arm 190. In this embodiment, lifting device platform 195 includes a through hole for receiving a fastener to fasten lifting device 160 thereto. In this embodiment, lifting device platform 195 includes through holes 198a and 198b which extend therethrough. Through holes 198a and 198b can be aligned with corresponding through holes of lifting device base 161, and the fastener extends through the through holes and lifting device base 161.

In this embodiment, lower bracket 180 includes a friction plate 196 coupled to support arm 181 with a support plate 197, as shown in FIGS. 8a, 8b and 8d. Support plate 197 is coupled to support arm 181 with a weldment 238, and friction plate 196 is coupled to support arm with a weldment 237. The spacing between friction plate 196 and support arm 181 is adjustable in response to adjusting the thickness of support plate 197. The spacing between friction plate 196 and support arm 181 increases and decreases in response to increasing and decreasing the thickness of support plate 197. As discussed in more detail above, friction plate 196 engages friction plate 135 of platform 110 in response to raising frame arm 111 with lifting device 160, as described above with FIGS. 7a, 7b and 7c. Friction plates 196 and 135 engaged each other to restrict the movement of platform 110 when vehicle 100 moves. In this way, vehicle 100 moves the load carried by platform 110 from one location to another.

Figure 8F:
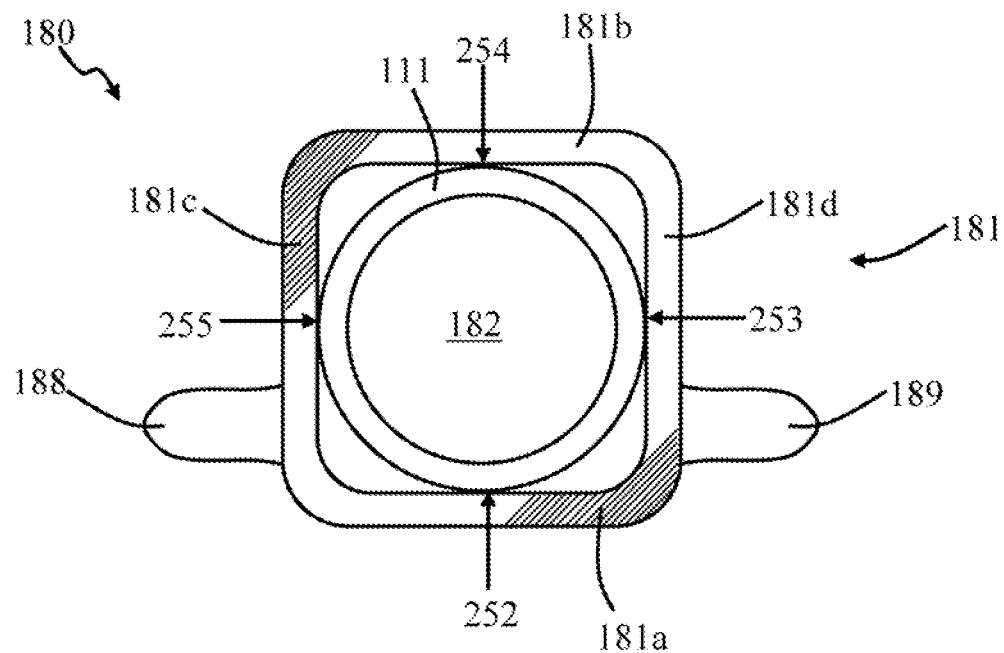
FIG. 8f is a top view of the lower bracket of FIG. 8a, and shows a circular frame arm and support arm.
Figure 8G:
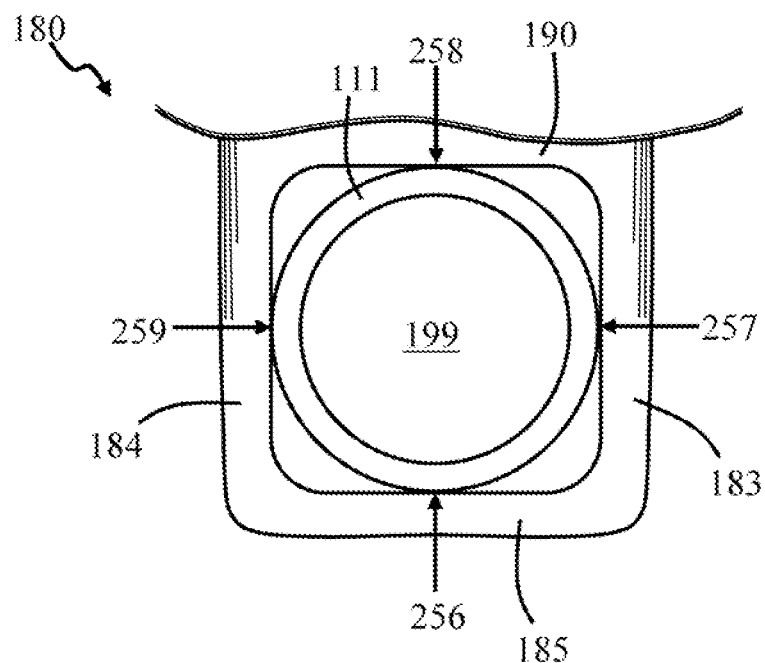
FIG. 8g is a bottom view of the lower bracket of FIG. 8a, and shows a circular frame arm and hitch arm, projecting arms and a projecting arm plate.

FIGS. 8f and 8g are views of lower bracket 180 showing a portion thereof shown in FIGS. 8d and 8e, respectively. It should be noted that. FIG. 8f is a top view of lower bracket and shows frame arm 111 and support arm 181. Further, it should be noted that FIG. 8g is a bottom view of lower bracket 180 and shows frame arm 111 and hitch arm 190, projecting arms 183 and 184 and projecting arm plate 185.

In FIG. 8f, frame arm 111 has a circular cross-section and engages an inner periphery of support arm 181. In this embodiment, the cross sectional shape of frame arm 111 is chosen to not match the cross sectional shape of support arm opening 182. Support arm 181 has sidewalls 181a, 181b, 181c and 181d, wherein loop anchors 188 and 189 are coupled to sidewalls 181c and 181d, respectively. Further, sidewall 181a faces friction plate 196 and sidewall 181b is opposed to sidewall 181a. Frame arm 111 engages an inner periphery of sidewall 181a proximate to a region indicated by an indication arrow 252. Frame arm 111 engages an inner periphery of sidewall 181b proximate to a region indicated by an indication arrow 254. Frame arm 111 engages an inner periphery of sidewall 181c proximate to a region indicated by an indication arrow 255. Frame arm 111 engages an inner periphery of sidewall 181d proximate to a region indicated by an indication arrow 253.

In FIG. 8g, frame arm 111 has a circular cross-section and engages an inner periphery of projecting arm 183 proximate to a region indicated by an indication arrow 257. Frame arm 111 engages an inner periphery of projecting arm 184 proximate to a region indicated by an indication arrow 259. Frame arm 111 engages an inner periphery of projecting arm plate 185 proximate to a region indicated by an indication arrow 256. Frame arm 111 engages a proximal end of hitch arm 190 proximate to a region indicated by an indication arrow 258.

Figure 8H:
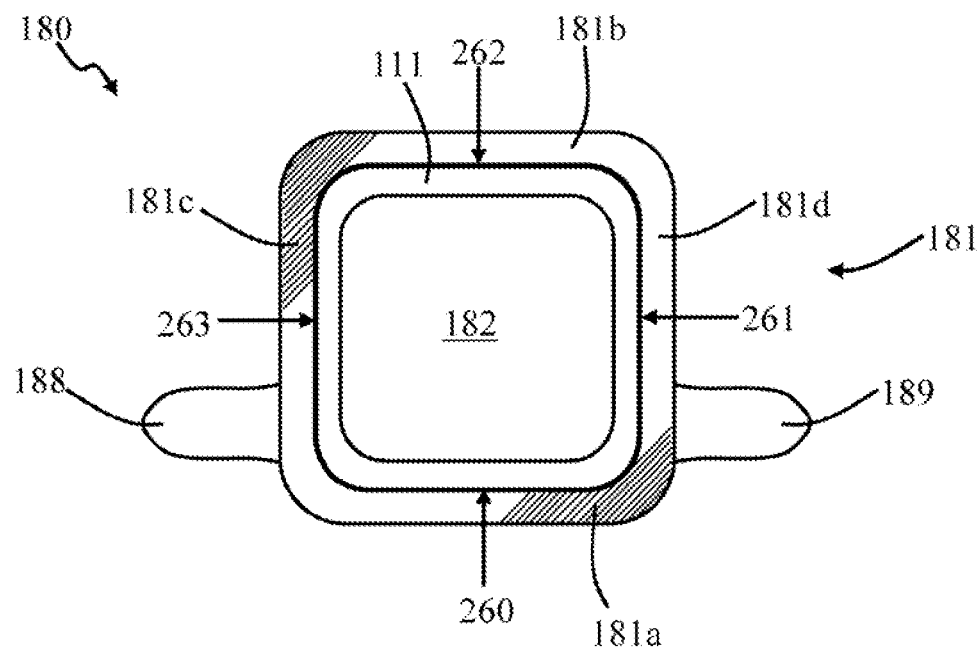
FIG. 8h is atop view of the lower bracket of FIG. 8a, and shows a square frame arm and support arm.
Figure 8I:
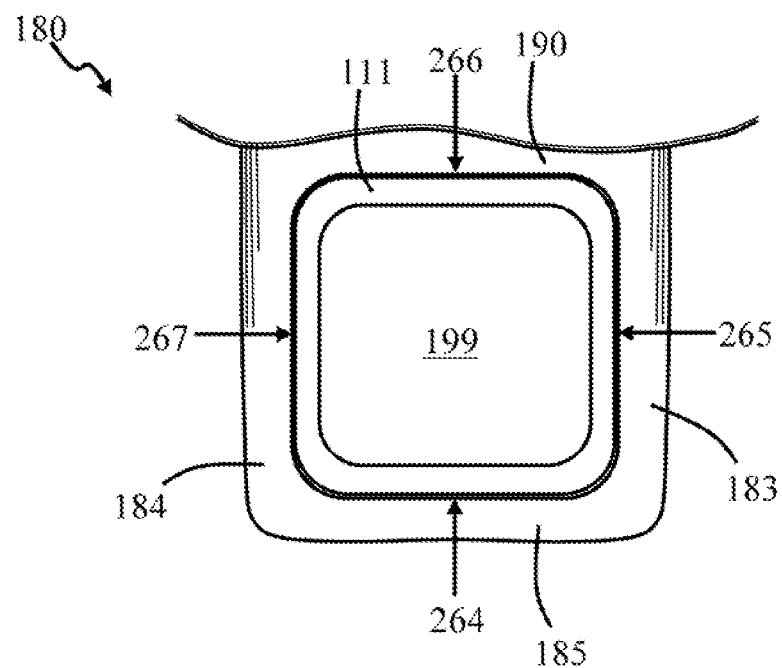
FIG. 8i is a bottom view of the lower bracket of FIG. 8a, and shows a square frame arm and hitch arm, projecting arms and a projecting arm plate.

FIGS. 8h and 8i are views of lower bracket 180 showing a portion thereof shown in FIGS. 8d and 8e, respectively. It should be noted that FIG. 8h is a top view of lower bracket and shows frame arm 111 and support arm 181. Further, it should be noted that FIG. 8i is a bottom view of lower bracket and shows frame arm 111 and hitch arm 190, projecting arms 183 and 184 and projecting arm plate 185.

In FIG. 8h, frame arm 111 has a rectangular cross-section with rounded corners and engages an inner periphery of support arm 181. In this embodiment, the cross sectional shape of frame arm 111 is chosen to match the cross sectional shape of support arm opening 182. As mentioned above, support arm 181 has sidewalls 181a, 181b, 181c and 181d, wherein loop anchors 188 and 189 are coupled to sidewalls 181c and 181d, respectively. Further, sidewall 181a faces friction plate 196 and sidewall 181b is opposed to sidewall 181a. Frame arm 111 engages an inner periphery of sidewall 181a proximate to a region indicated by an indication arrow 260. Frame arm 111 engages an inner periphery of sidewall 181b proximate to a region indicated by an indication arrow 262. Frame arm 111 engages an inner periphery of sidewall 181c proximate to a region indicated by an indication arrow 263. Frame arm 111 engages an inner periphery of sidewall 181d proximate to a region indicated by an indication arrow 261.

In FIG. 8i, frame arm 111 has a rectangular cross-section with rounded corners and engages an inner periphery of projecting arm 183 proximate to a region indicated by an indication arrow 265. Frame arm 111 engages an inner periphery of projecting arm 184 proximate to a region indicated by an indication arrow 267. Frame arm 111 engages an inner periphery of projecting arm plate 185 proximate to a region indicated by an indication arrow 264. Frame arm 111 engages a proximal end of hitch arm 190 proximate to a region indicated by an indication arrow 266.

Figure 9A:
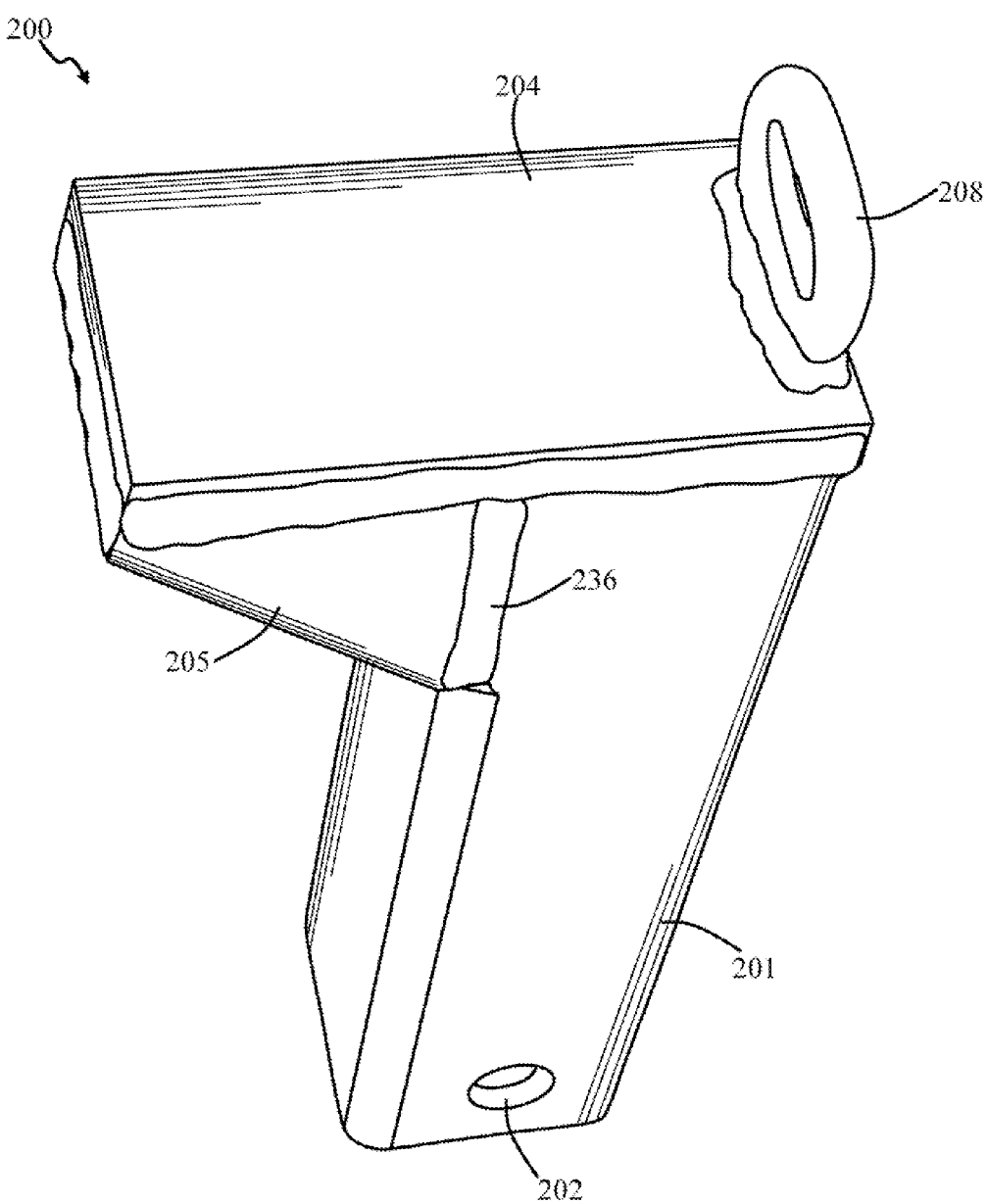
FIGS. 9a and 9b are opposed perspective views of an upper bracket of the hauler apparatus of FIG. 1.
Figure 9B:
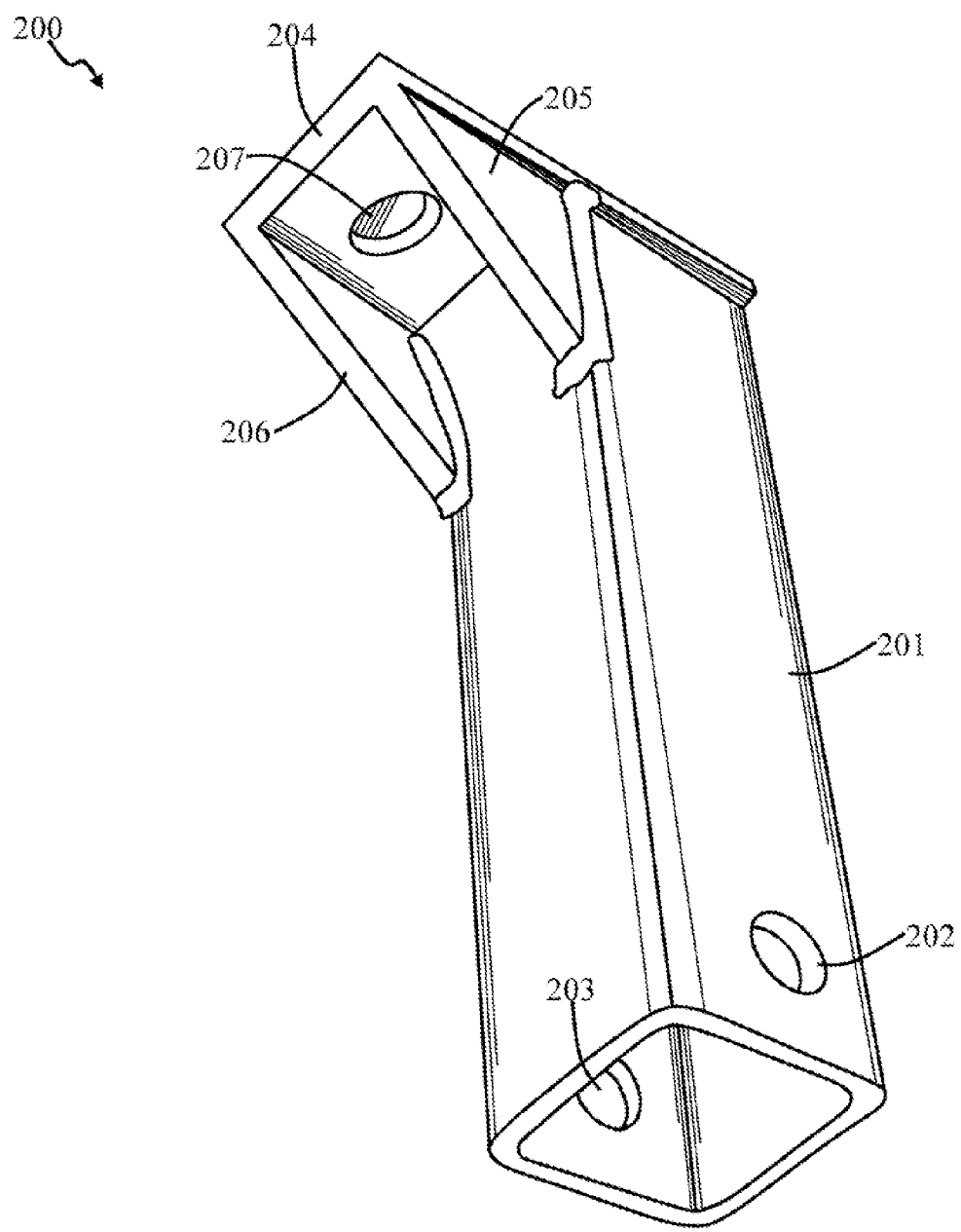
Figure 9C:
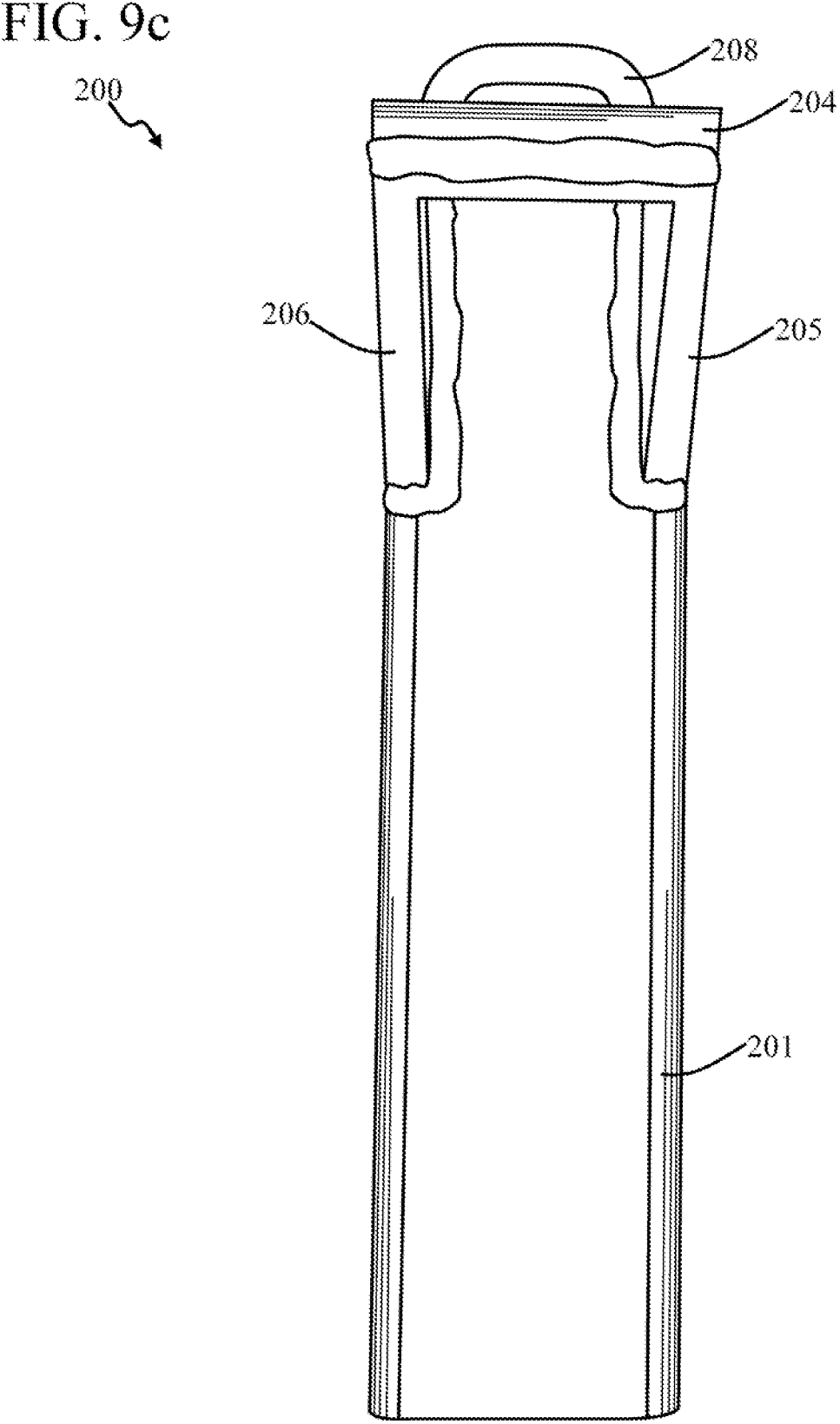
Figure 9D:
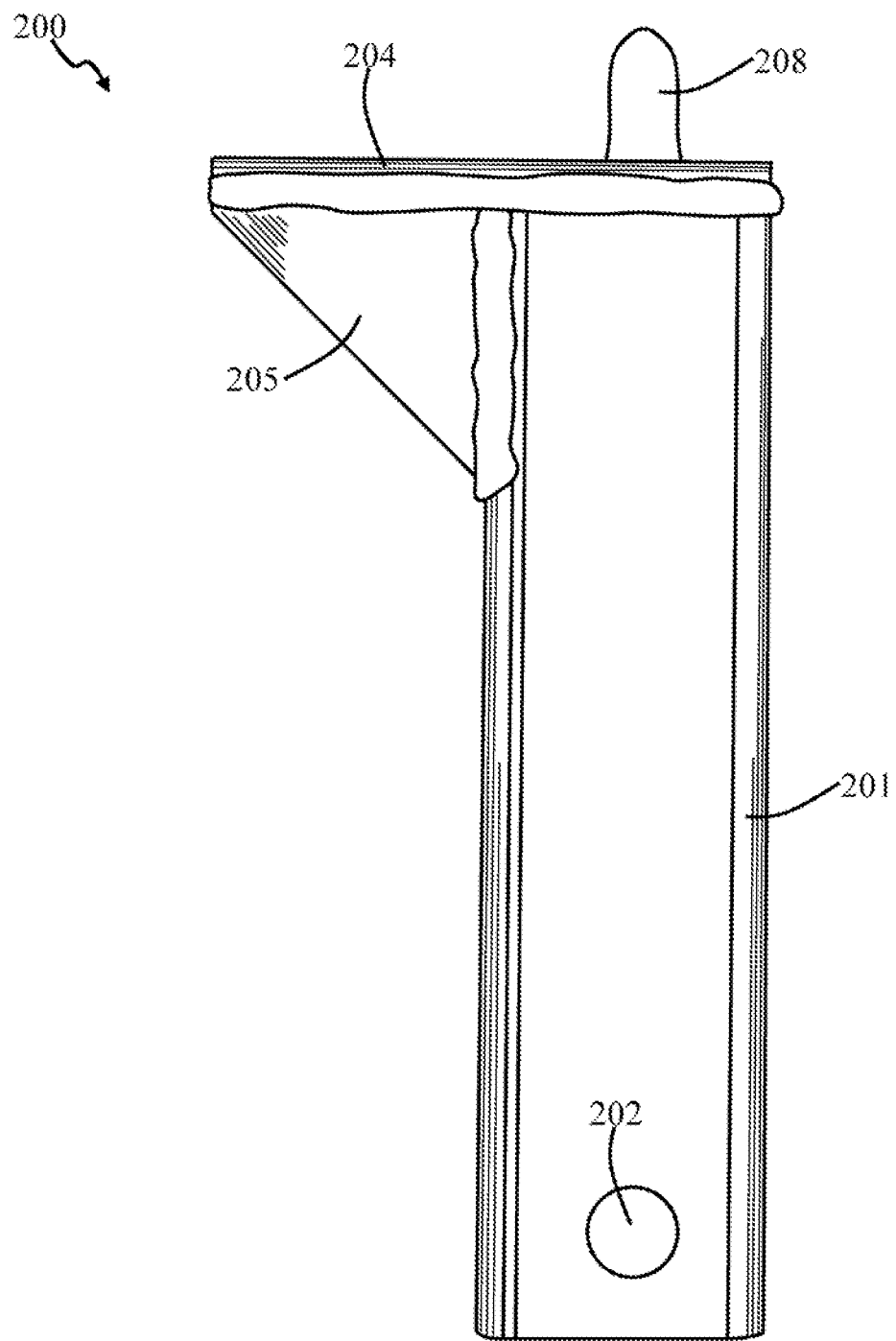

FIGS. 9a and 9b are opposed perspective views of an upper bracket 200 of hauler apparatus 105 of FIG. 1, and FIGS. 9c and 9d are side views of tipper bracket 200 of FIG. 9a. It should be noted that the various components of upper bracket 200 can be coupled together in many different ways, such as by using fasteners and weldments. In this embodiment, the various components of upper bracket 200 are coupled together using weldments, such as a weldment 236.

In this embodiment, upper bracket 200 includes a support arm 201 with opposed locking pin through holes 202 and 203 proximate to an end thereof. Upper bracket 200 includes a projecting arm 204 coupled to an opposed end of support arm 201. Upper bracket 200 includes projecting arm braces 205 and 206 coupled to support arm 201 and projecting arm 204. Upper bracket 200 includes a loop anchor 208 coupled to projecting arm 204. In this embodiment, a blind hole 209 extends through a lower surface of projecting arm 204. Blind hole 209 is for receiving a distal end of hydraulic cylinder arm 164. It should be noted that blind hole 207 is optional and, in some embodiments, hydraulic cylinder arm 164 engages the lower surface of projecting arm 204. The lower surface of projecting arm 204 faces projecting arm braces 205 and 206.

Figure 10A:
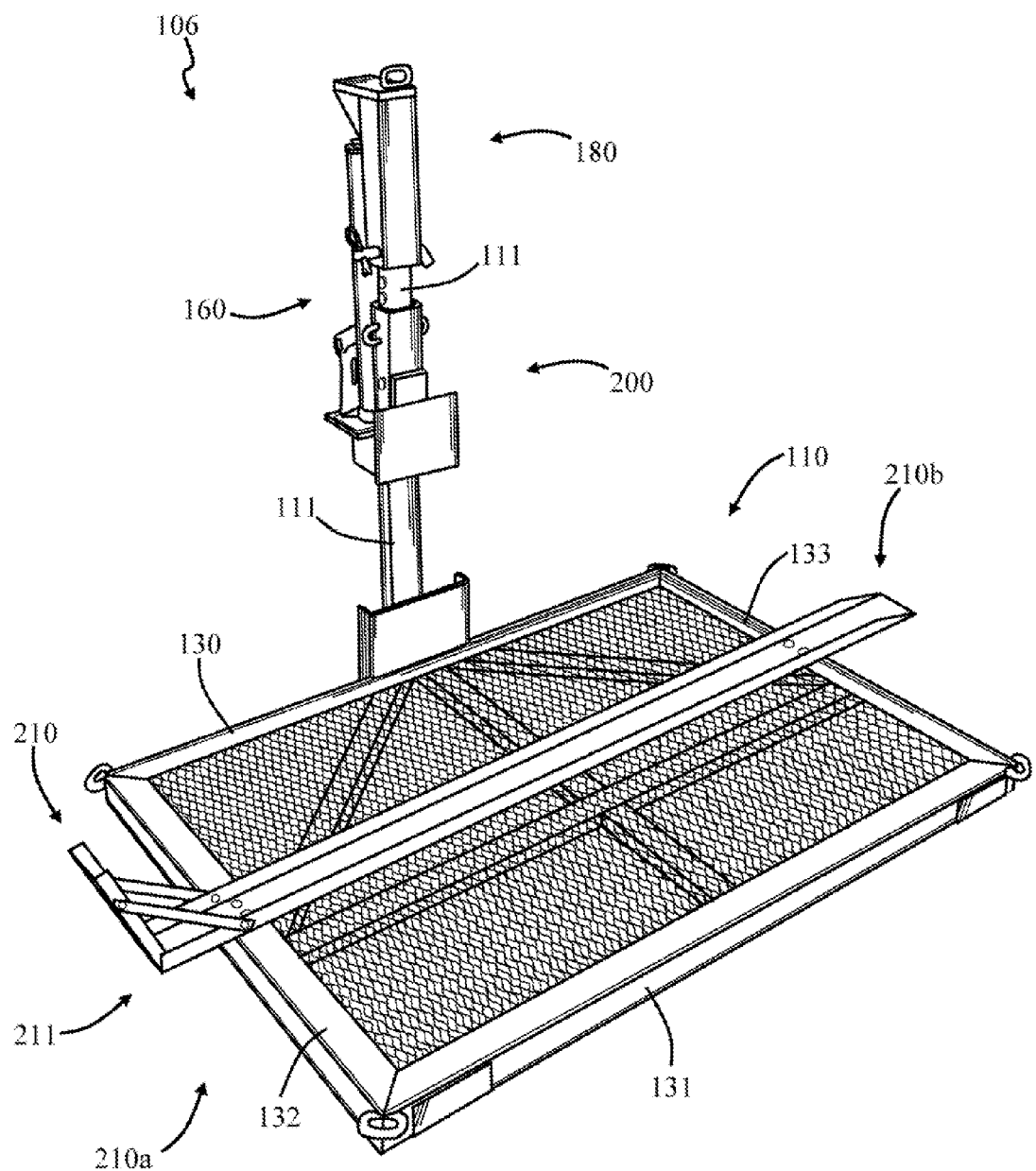
FIG. 10a is a perspective view of the hauler apparatus of FIG. 1, which carries a rail.

FIG. 10a is a perspective view of lifting device 106 of FIG. 1, which carries a rail 210. Rail 210 is for carrying a two wheeled vehicle, such as a motorcycle. In this embodiment, rail 210 includes a rail base 212, which extends between rail front and back ends 210a and 210b. Rail 210 includes opposed rail sides 212 and 213, which extend along the length of rail base 212. Opposed rail sides 212 and 213 extend upwardly from oppose sides of rail base 212.

In this embodiment, rail 210 includes a rail chock 211 positioned proximate to rail front end 210a. Rail chock 211 is for holding a wheel of the two wheeled vehicle so that the two wheeled vehicle is secure when vehicle 100 is in motion. The rail chock carried of rail 210 can be of many different types. Another embodiment of a rail chock will be discussed in more detail below with FIGS. 10e and 10f.

Lifting device 106 can carry rail 210 in many different ways. In this embodiment, rail 210 is carried by platform 110. Rail 210 can be carried by platform 110 in many different ways. In this embodiment, rail 210 is secured to side frame members 132 and 133. Rail 210 can he secured to side frame members 132 and 133 in many different ways, such as by using a fastener and weldment. In this embodiment, fasteners are used to fasten rail 210 to side frame members 132 and 133 so that rail 210 is fastened to platform 110 in a repeatably removable manner. In particular, rail base 212 includes openings which are aligned with corresponding openings of side frame members 132 and 133 (FIG. 1), and the fasteners extend through the openings. In this way, rail 210 can be fastened to platform 110 so that the two wheeled vehicle can be carried by platform 110, and rail 210 can be unfastened from platform 110 so that another load can be carried by platform 110.

In this embodiment, rail 210 is positioned between proximal frame member 130 and transverse frame members 122a and 122b. Rail 210 is positioned so it extends proximate to longitudinal frame member 121 and angled flame members 123 and 124. Rail 210 is positioned towards friction plate 135 and away from distal frame member 131 to reduce the amount of torque experienced by frame arm 111 when the two wheeled vehicle is carried by rail 210. In general, the amount of torque experienced by frame arm 111 increases and decreases as rail 210 is moved further from friction plate 135 and closer to friction plate 135, respectively.

Figure 10D:
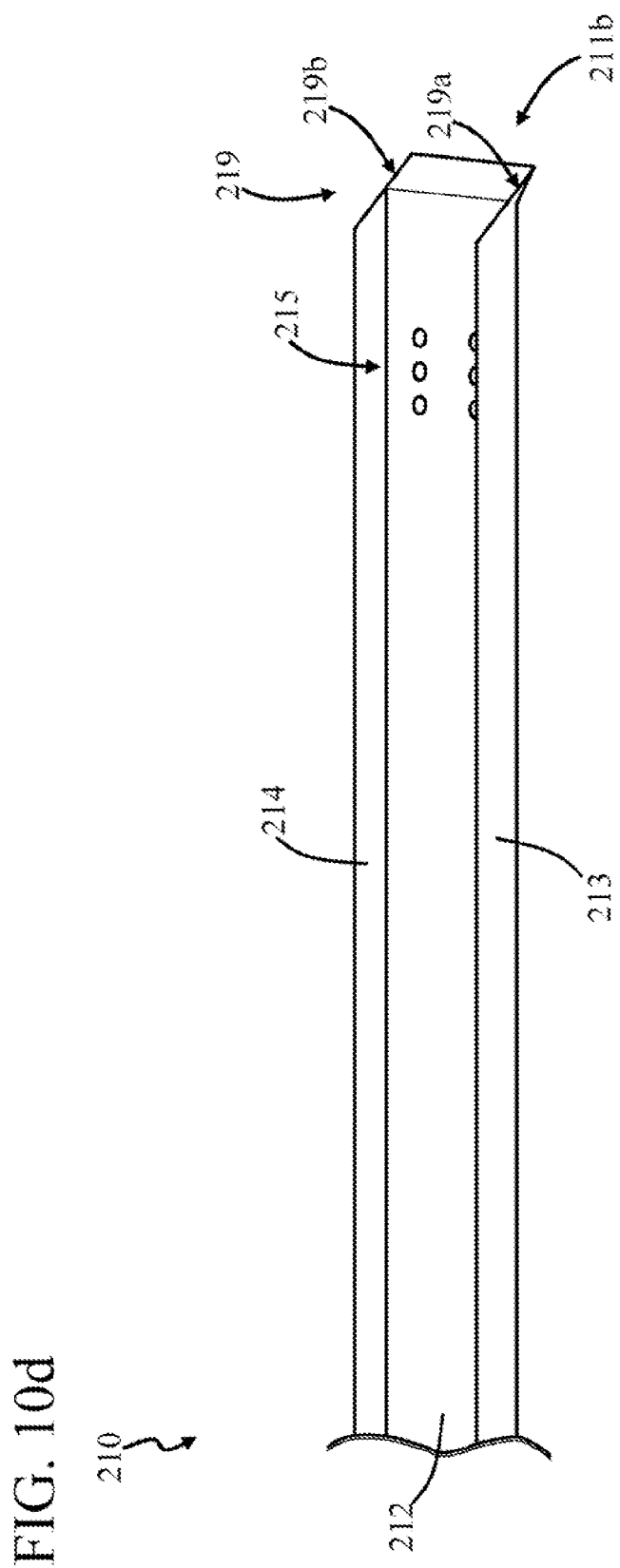

FIGS. 10b-10d are perspective views of steps of forming a tapered rail portion 219 proximate to a rail back end 211b of rail 210 of FIG. 10a. In this embodiment, a plurality of through holes 215 extend through rail base 212. Through openings 215 are for receiving a fastener to fasten rail 210 to platform 110, as described in more detail above with FIG. 10a.

In this embodiment, cuts 216a and 216b are formed through rail sides 213 and 214, respectively, and a perforation 217 is formed through rail base 212 and between cuts 216a and 216b. Cuts 216a and 216b can be formed in many different ways, such as with a saw. A rail base portion 212a extends between perforation 217 and rail back end 211b. It should be noted that rail base portion 212a is a portion of rail base 212. A rail side portion 213a extends between cut 216a and rail back end 211b. it should be noted that rail side portion 213a is a portion of rail side 213. A rail side portion 214a extends between cut 216b and rail back end 211b. It should be noted that rail side portion 214a is a portion of rail side 214. rail base portion 212a, rail side portion 213a and rail side portion 214a are included with tapered rail portion 219.

As shown in FIG. 10c, rail base portion 212a, rail side portion 213a and rail side portion 214a are moved downwardly so that cuts 216a and 216b increase in size. In this way, tapered rail portion 219 tapers downwardly from rail base 212.

As shown in FIG. 10d, a cut 219a is formed through rail side 213 and rail side portion 213a. Further, a cut 219b is formed through rail side 214 and rail side portion 214a. In operation, the wheel of the two wheeled vehicle is engaged with tapered rail portion 219 and rail base portion 212 lifts the wheel so it can roll onto rail base 212.

In FIG. 10c, weldments 218a and 218b are formed in cuts 216a and 216b, respectively, when rail base portion 212a, rail side portion 213a and rail side portion 214a are moved downwardly a desired angle. Weldments 218a and 218b hold rail base portion 212a, rail side portion 213a and rail side portion 214a at the desired angle.

Figure 10E:
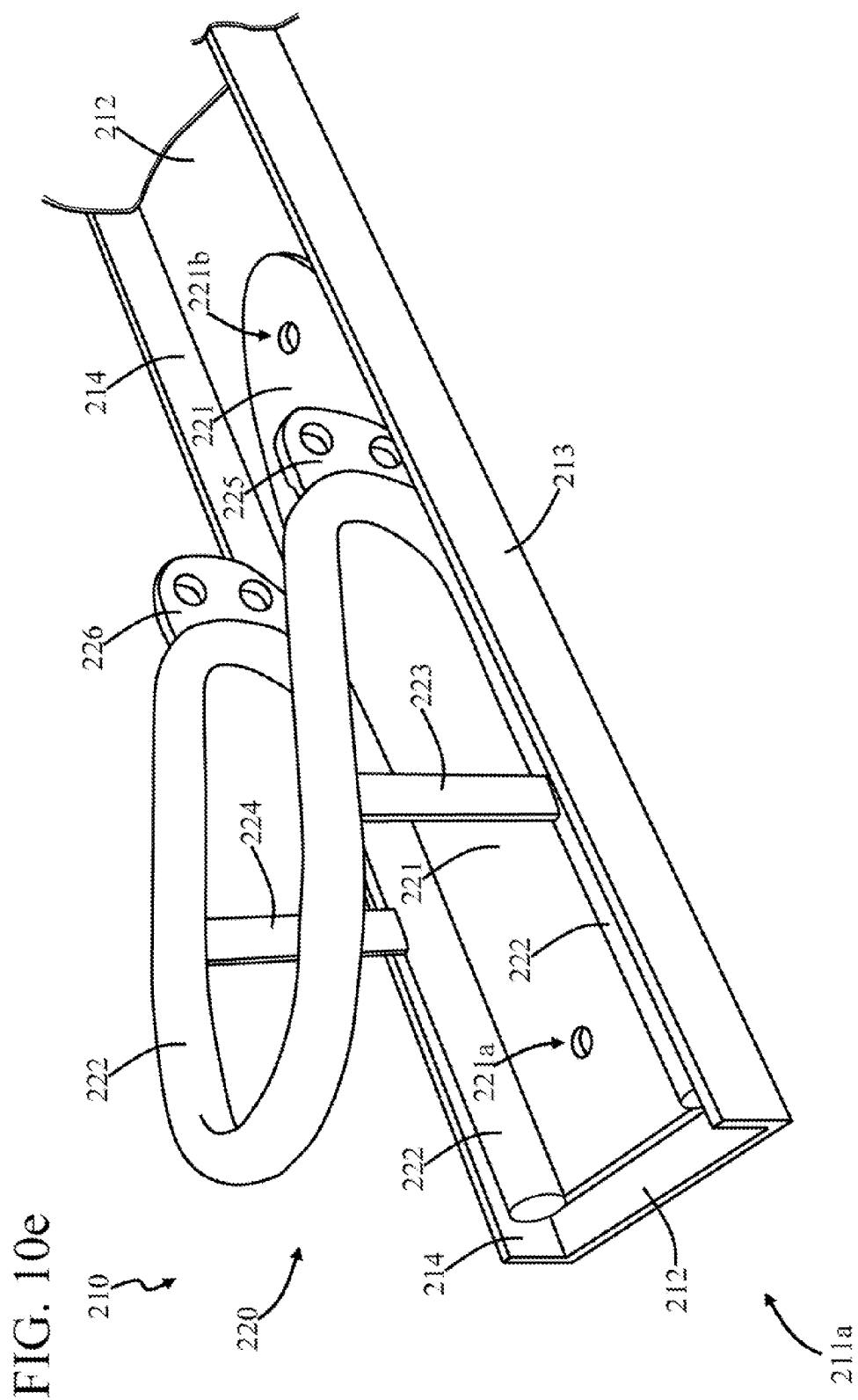

FIG. 10e is a perspective view of another embodiment of a rail chock 220 positioned proximate to rail front end 211s of rail 210 of FIG. 10a. Rail chock 220 is manufactured by J & P Cycles of Anamosa, Iowa. In this embodiment, rail chock 220 includes a chock base 221 with chock base openings 221a and 221b extending therethrough. Rail chock 220 includes a chock tire support 222 carried by chock base 221. Chock tire support 222 is for supporting the wheel of the two wheeled vehicle. Rail chock 220 includes chock tire support stands 223 and 224 which provide support to chock tire support 222. Rail chock 220 includes opposed chock tire support brackets 225 and 226 which are coupled to opposed sides of chock tire support 222.

Figure 10F:
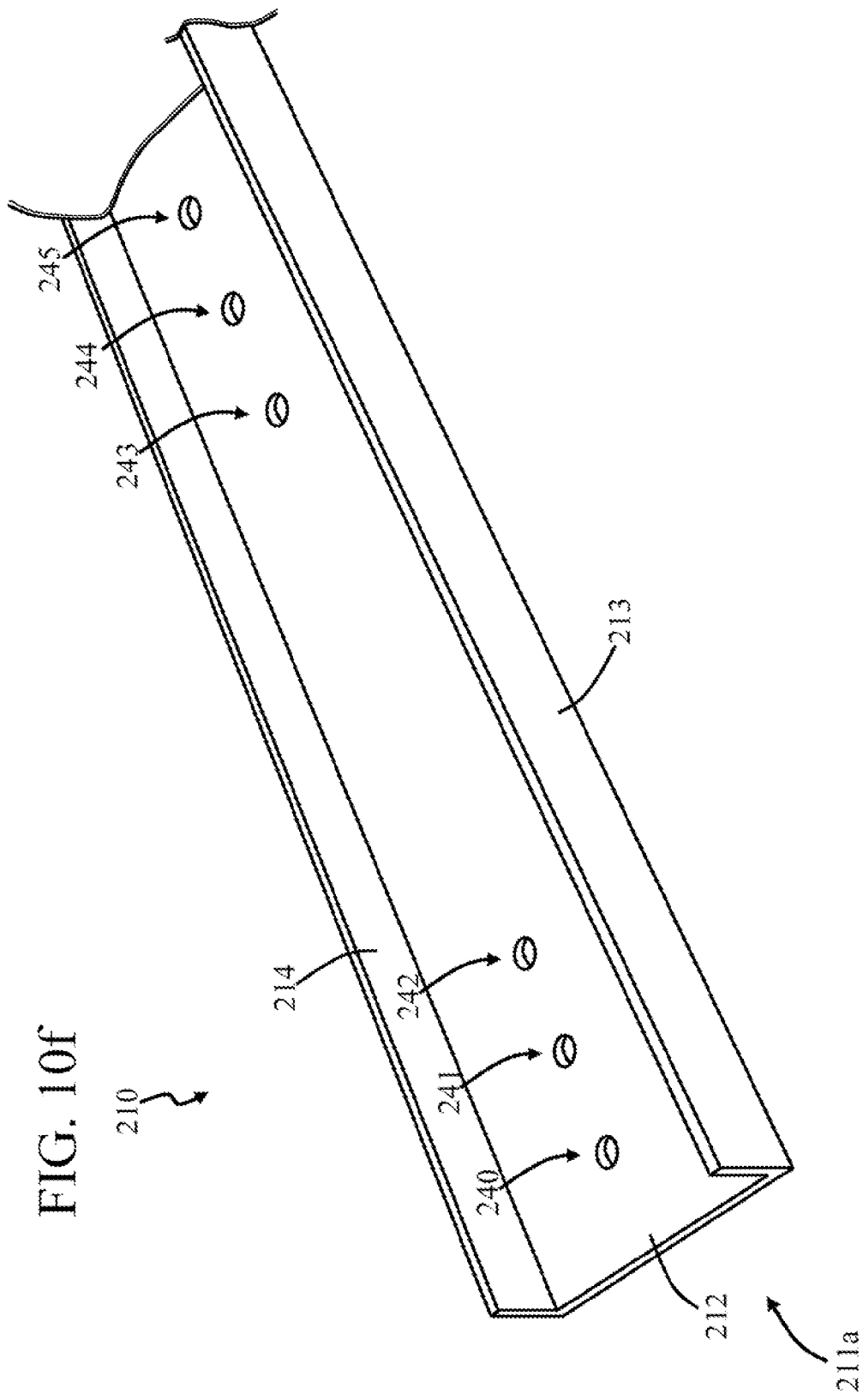
FIG. 10f is a perspective view of the front end of the rail of FIG. 10a, wherein the rail includes through holes for positioning the chock of FIG. 10e.

FIG. 10f is a perspective view of front end 211a of rail 210 of FIG. 10a, wherein rail 210 includes through holes for positioning rail chock 220 of FIG. 10e, In this embodiment, through holes 240, 241 and 242 extend through rail base 212 proximate to front end 211a, and through holes 243, 244 and 245 extend through rail base 212 away from front end 211a.

In operation, chock base opening 221a is aligned with one of through holes 240, 241 and 242. When chock base opening 221a is aligned with through hole 240, chock base opening 221b will be aligned with through hole 243. When chock base opening 221a is aligned with through hole 241, chock base opening 221b will be aligned with through hole 244. When chock base opening 221a is aligned with through hole 242, chock base opening 221b will be aligned with through hole 245. In this way, rail chock 220 can be positioned a desired distance from front end 211a, and rail 210 can accommodate two wheeled vehicles of different lengths. In general, as the length of the two wheeled vehicle increases, chock base opening 221a is moved so it is aligned with through holes 240. Further, as the length of the two wheeled vehicle increases, chock base opening 221a is moved so it is aligned with through holes 242.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A hauler apparatus, comprising:
a lower bracket having a first support arm with a first support arm opening extending therethrough, and a projecting arm with a projecting arm opening extending therethrough;
an upper bracket having a second support arm with a second support arm opening extending therethrough;
a frame arm which extends through the first support arm opening and projecting arm opening, and has a distal end which terminates within the second support arm opening;
wherein the outer shape of the frame arm is different from the inner shape of the first and second support arm openings; and
a lifting device coupled between the upper and lower brackets.

2. The apparatus of claim 1, wherein the upper bracket is moved relative to the lower bracket in response to actuating the lifting device.

3. The apparatus of claim 1, wherein the lower bracket includes a hitch arm coupled to a vehicle hitch.

4. The apparatus of claim 1, wherein the lower bracket includes a first friction plate coupled to the first support arm.

5. The apparatus of claim 4, wherein a proximal end of the frame arm is coupled to a platform having a second friction plate.

6. The apparatus of claim 5, wherein the first and second friction plates slidingly engage each other in response to moving the upper bracket away from the lower bracket in response to actuating the lifting device.

7. The apparatus of claim 5, wherein the second friction plate is moved relative to the first friction plate in response to actuating the actuator.

8. A hauler apparatus, comprising;
a lower bracket having a first support arm with a first support arm opening extending therethrough, wherein the first support arm includes a hollow member with a square cross-section, and a projecting arm with a projecting arm opening extending therethrough;
an upper bracket having a second support arm with a second support arm opening extending therethrough, wherein the second support arm includes a hollow member with a square cross-section; and
a frame arm which extends through the and second support arm openings and the projecting arm opening, and has a distal end which terminates within the second support arm, wherein the frame arm includes a hollow member with a circular cross-section;
wherein the projecting arm opening is aliened with the first and second support arm openings coupled to the first support arm;
wherein the lower bracket includes a hitch arm coupled to the projecting arm and vehicle hitch.

9. The apparatus of claim 8, wherein the lower bracket includes a lifting device platform carried by the projecting arm.

10. The apparatus of claim 9, further including a lifting device coupled between the lifting device platform and upper bracket.

11. A hauler apparatus, comprising:
a lower bracket having a first support arm, wherein the first support arm includes a hollow member with a rectangular cross-section and a first support arm opening extending therethrough,
an upper bracket having a second support arm, wherein the second support arm includes a hollow member with a rectangular cross-section and a second support arm opening; and
a frame arm which extends through the first and second support arm openings, and has a distal end which terminates within the second support arm, wherein
the frame arm includes a hollow member with a circular cross-section and wherein the outer periphery of the frame arm engages the inner periphery of the first support arm;
wherein the lower bracket includes opposed projecting arms coupled to the first support arm, and a first friction plate coupled to the first support arm.

12. The apparatus of claim 11, wherein the lower bracket includes a hitch arm coupled to the opposed projecting arms and a vehicle hitch.

13. The apparatus of claim 12, wherein the lower bracket includes a lifting device platform carried by the opposed projecting arms.

14. The apparatus of claim 13, wherein the upper bracket includes a projecting arm coupled to the second support arm.

15. The apparatus of claim 14, further including a lifting device coupled between the lifting device platform and projecting arm of the upper bracket.

16. he apparatus of claim 15, wherein a proximal end of the frame arm is coupled to a platform having a second friction plate, wherein the first and second friction plates slidingly engage each other in response to moving the upper bracket away from the lower bracket in response to actuating the lifting device.

* * * * *